(12) United States Patent
Bondich et al.

(10) Patent No.: US 10,360,708 B2
(45) Date of Patent: Jul. 23, 2019

(54) AVATAR BASED IDEOGRAM GENERATION

(71) Applicant: Snap Inc, Santa Monica, CA (US)

(72) Inventors: Artem Bondich, Sochi (RU); Volodymyr Maltsev, Sochi (RU)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 15/199,472

(22) Filed: Jun. 30, 2016

(65) Prior Publication Data

US 2018/0005420 A1    Jan. 4, 2018

(51) Int. Cl.
*G09G 5/00*  (2006.01)
*G06T 11/60* (2006.01)
*G06K 9/00*  (2006.01)

(52) U.S. Cl.
CPC .......... *G06T 11/60* (2013.01); *G06K 9/00281* (2013.01); *G06K 9/00288* (2013.01); *G06K 9/00315* (2013.01); *G06T 2200/24* (2013.01)

(58) Field of Classification Search
CPC ............................ G06T 11/60; G06K 9/00288
USPC ....... 345/619, 629, 630, 632, 633, 634, 636, 345/637, 638
See application file for complete search history.

(56) References Cited

U.S. PATENT DOCUMENTS

| | | | |
|---|---|---|---|
| 6,038,295 A | 3/2000 | Mattes | |
| 6,980,909 B2 | 12/2005 | Root et al. | |
| 7,173,651 B1 | 2/2007 | Knowles | |
| 7,280,123 B2* | 10/2007 | Bentley | G06T 11/60 345/629 |
| 7,411,493 B2 | 8/2008 | Smith | |
| 7,535,890 B2 | 5/2009 | Rojas | |
| 8,131,597 B2 | 3/2012 | Hudetz | |
| 8,199,747 B2 | 6/2012 | Rojas et al. | |
| 8,332,475 B2 | 12/2012 | Rosen et al. | |
| 8,570,326 B2* | 10/2013 | Gorev | G06T 11/206 345/440 |

(Continued)

FOREIGN PATENT DOCUMENTS

| | | |
|---|---|---|
| CA | 2887596 A1 | 7/2012 |
| WO | WO-2018006053 A1 | 1/2018 |

OTHER PUBLICATIONS

Broderick, Ryan: "Everything You Need to Know About Japan's Amazing Photo Booths", Jan. 22, 2016 (available at: https://www.buzzfeed.com/ryanhatesthis/look-how-kawaii-i-am?utm_term=.kra5QwGNZ#.muYoVB7qJ) pp. 1-21.*

(Continued)

*Primary Examiner* — Sarah Lhymn
(74) *Attorney, Agent, or Firm* — Schwegman Lundberg & Woessner, P.A.

(57) ABSTRACT

Systems, devices, media, and methods are presented for generating ideograms from a set of images received in an image stream. The systems and methods detect at least a portion of a face within the image and identify a set of facial landmarks within the portion of the face. The systems and methods determine one or more characteristics representing the portion of the face, in response to detecting the portion of the face. Based on the one or more characteristics and the set of facial landmarks, the systems and methods generate a representation of a face. The systems and methods position one or more graphical elements proximate to the graphical model of the face and generate an ideogram from the graphical model and the one or more graphical elements.

14 Claims, 13 Drawing Sheets

(56) References Cited

U.S. PATENT DOCUMENTS

| | | | |
|---|---|---|---|
| 8,718,333 B2 | 5/2014 | Wolf et al. | |
| 8,724,622 B2 | 5/2014 | Rojas | |
| 8,874,677 B2 | 10/2014 | Rosen et al. | |
| 8,909,679 B2 | 12/2014 | Root et al. | |
| 8,995,433 B2 | 3/2015 | Rojas | |
| 9,040,574 B2 | 5/2015 | Wang et al. | |
| 9,055,416 B2 | 6/2015 | Rosen et al. | |
| 9,100,806 B2 | 8/2015 | Rosen et al. | |
| 9,100,807 B2 | 8/2015 | Rosen et al. | |
| 9,191,776 B2 | 11/2015 | Root et al. | |
| 9,204,252 B2 | 12/2015 | Root | |
| 9,443,227 B2 | 9/2016 | Evans et al. | |
| 9,489,661 B2 | 11/2016 | Evans et al. | |
| 9,491,134 B2 | 11/2016 | Rosen et al. | |
| 9,641,870 B1 | 5/2017 | Cormie et al. | |
| 2003/0206171 A1* | 11/2003 | Kim | G06T 11/00 345/473 |
| 2009/0013268 A1* | 1/2009 | Amit | G06T 11/60 715/763 |
| 2009/0319178 A1 | 12/2009 | Khosravy et al. | |
| 2009/0328122 A1 | 12/2009 | Amento et al. | |
| 2010/0179991 A1* | 7/2010 | Lorch | H04M 1/7253 709/206 |
| 2010/0290756 A1 | 11/2010 | Karaoguz et al. | |
| 2011/0202598 A1 | 8/2011 | Evans et al. | |
| 2012/0013770 A1 | 1/2012 | Stafford et al. | |
| 2012/0209924 A1 | 8/2012 | Evans et al. | |
| 2014/0055554 A1 | 2/2014 | Du et al. | |
| 2014/0085293 A1* | 3/2014 | Konoplev | A63F 13/12 345/419 |
| 2015/0213604 A1 | 7/2015 | Li et al. | |
| 2015/0220774 A1 | 8/2015 | Ebersman et al. | |
| 2016/0093078 A1* | 3/2016 | Davis | G06F 17/30817 345/629 |
| 2016/0163084 A1 | 6/2016 | Corazza et al. | |
| 2016/0210500 A1* | 7/2016 | Feng | G06T 19/20 |
| 2016/0275721 A1* | 9/2016 | Park | G06T 17/205 |
| 2017/0113140 A1 | 4/2017 | Blackstock et al. | |
| 2017/0118145 A1* | 4/2017 | Aittoniemi | H04L 51/10 |
| 2017/0336960 A1* | 11/2017 | Chaudhri | G06F 3/04883 |
| 2018/0113587 A1 | 4/2018 | Allen et al. | |

OTHER PUBLICATIONS

Chan, Connie: "The Elements of Stickers", Jun. 20, 2016 (available at: https://a16z.com/2016/06/17/stickers/) pp. 1-15.*

"International Application Serial No. PCT/US2017/040447, International Search Report dated Oct. 2, 2017", 4 pgs.

"International Application Serial No. PCT/US2017/040447, Written Opinion dated Oct. 2, 2017", 6 pgs.

Chi-Hyoung, Rhee, et al., "Cartoon-like Avatar Generation Using Facial Component Matching", International Journal of Multimedia and Ubiquitous Engineering, (Jul. 30, 2013), 69-78.

Leyden, John, "This SMS will self-destruct in 40 seconds", [Online]. Retrieved from the Internet: <URL: http://www.theregister.co.uk/2005/12/12/stealthtext/, (Dec. 12, 2005), 1 pg.

"U.S. Appl. No. 15/369,499, Non Final Office Action dated Aug. 15, 2018", 22 pgs.

"U.S. Appl. No. 15/369,499, Response filed Nov. 15, 2018 to Non Final Office Action dated Aug. 15, 2018", 10 pgs.

"U.S. Appl. No. 16/115,259, Preliminary Amendment filed Oct. 18, 2018 t ", 6 pgs.

"International Application Serial No. PCT/US2017/040447, International Preliminary Report on Patentability dated Jan. 10, 2019", 8 pgs.

"U.S. Appl. No. 15/369,499, Final Office Action dated Jan. 31, 2019", 22 pgs.

U.S. Appl. No. 16/115,259, filed Aug. 28, 2018, Generating and Displaying Customized Avatars in Media Overlays.

\* cited by examiner

AVATAR BASED IDEOGRAM GENERATION

TECHNICAL FIELD

Embodiments of the present disclosure relate generally to automated processing of images. More particularly, but not by way of limitation, the present disclosure addresses systems and methods for generating ideogram representations of a face depicted within a set of images.

BACKGROUND

Telecommunications applications and devices can provide communication between multiple users using a variety of media, such as text, images, sound recordings, and/or video recording. For example, video conferencing allows two or more individuals to communicate with each other using a combination of software applications, telecommunications devices, and a telecommunications network. Telecommunications devices may also record video streams to transmit as messages across a telecommunications network.

Currently ideograms in telecommunication applications are centrally generated by entities distributing applications or brands releasing licensed content. Ideograms are provided in telecommunication applications in set packages or individual downloads.

BRIEF DESCRIPTION OF THE DRAWINGS

Various ones of the appended drawings merely illustrate example embodiments of the present disclosure and should not be considered as limiting its scope.

Figure 1:
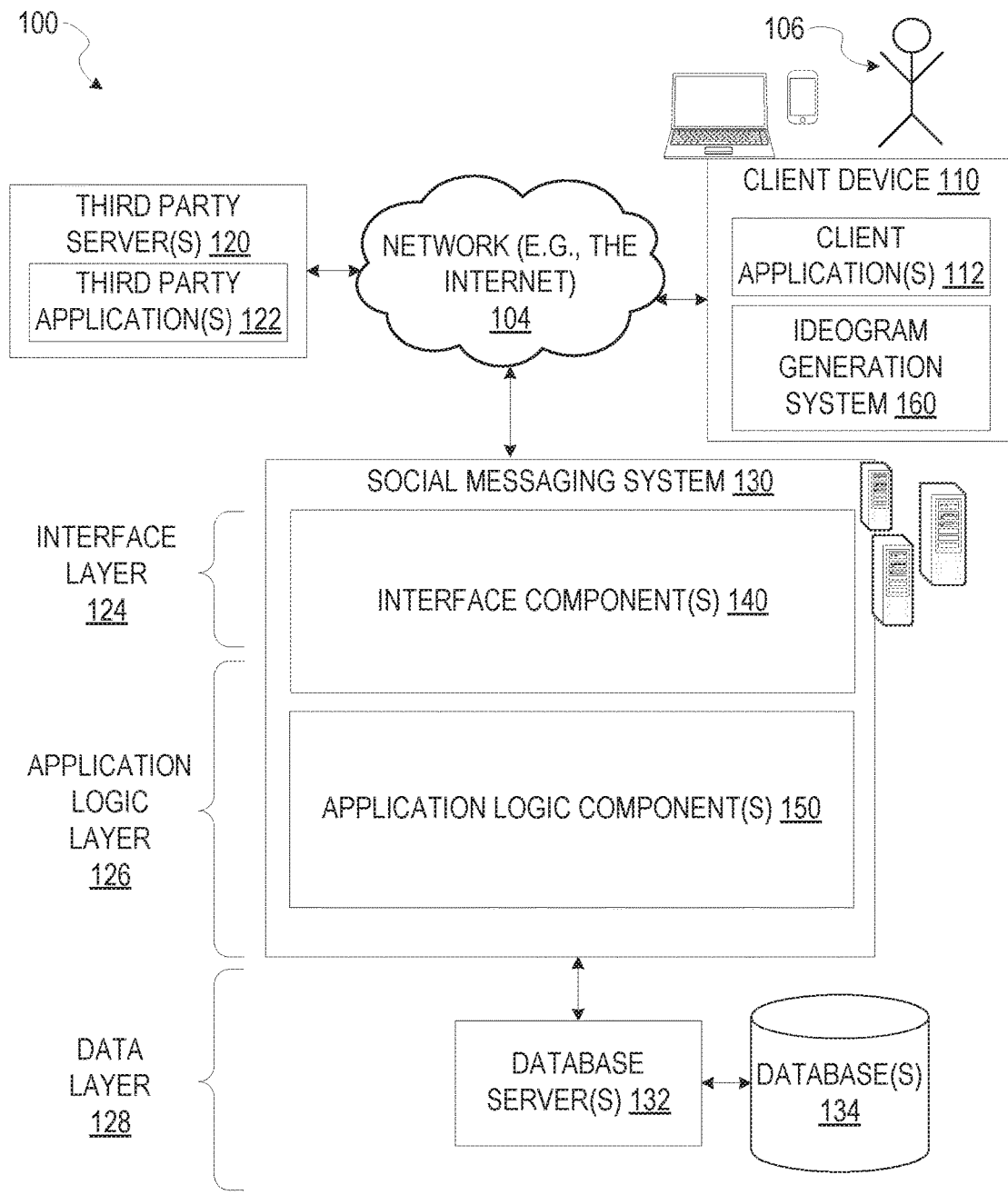
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products illustrative of embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Although methods exist to generate avatars or representations of faces within an image, most of these methods do not employ facial recognition or facial landmarks as a basis for the generated avatar or representation of the face. Although methods exist to generate ideograms for use in telecommunication applications, these methods are not generated from avatars or image streams. Further, these methods do not generate ideograms from image streams captured in real time on a client device. Generation of ideograms is often performed by entities distributing telecommunication applications. The ideograms are then distributed to users via the telecommunications application. These ideograms provide no customization and do not reflect avatars or images associated with a user. Accordingly, there is still a need in the art to improve generation of avatars and ideograms without user interaction or with minimal user interaction. Further, there is still a need in the art to improve generation of stylized (e.g., animated and cartoon image) ideograms which are reasonable facsimiles of a face depicted within an image using facial landmarks derived from the face and measurements generated based on the facial landmarks. As described herein, methods and systems are presented for generating facial avatars or ideograms based on facial landmarks of a face depicted within an image using a user interaction of an initial selection.

Embodiments of the present disclosure may relate generally to automated image segmentation and generation of facial representations within an ideogram based on the segmented image. In one embodiment, a user of a client device may open an application operating on the client device. Selection of a user interface element by the user causes capture of an image using a camera of the client device. The user may then select a "generate sticker" button within the application to cause the application to build an avatar using the captured image and enable generation of an ideogram based on the avatar. The application may identify facial landmarks, measurements between facial landmarks, and characteristics of the face to generate a look-alike avatar based on the image and proportions of the face. After generating the avatar, the application may present buttons enabling the user to save the avatar, manipulate or customize the avatar, and an ideogram. The ideogram may include digital stickers, emojis, animated bitmap images, and other graphics which may be shared with other users by including the graphics in messages or other communications between client devices.

The above is one specific example. The various embodiments of the present disclosure relate to devices and instructions by one or more processors of a device to modify an image or a video stream transmitted by the device to another device while the video stream is being captured (e.g., modifying a video stream in real time). An ideogram generation system is described that identifies and tracks objects and areas of interest within an image or across a video stream and through a set of images comprising the video stream. In various example embodiments, the ideogram generation system identifies and tracks one or more facial features depicted in a video stream or within an image and performs image recognition, facial recognition, facial processing functions with respect to the one or more facial features and interrelations between two or more facial features, and generation of ideograms from the avatar and the tracked facial features.

FIG. 1 is a network diagram depicting a network system 100 having a client-server architecture configured for exchanging data over a network, according to one embodiment. For example, the network system 100 may be a messaging system where clients communicate and exchange data within the network system 100. The data may pertain to various functions (e.g., sending and receiving text and media communication, determining geolocation, etc.) and aspects (e.g., transferring communications data, receiving and transmitting indications of communication sessions, etc.) associated with the network system 100 and its users. Although illustrated herein as client-server architecture, other embodiments may include other network architectures, such as peer-to-peer or distributed network environments.

As shown in FIG. 1, the network system 100 includes a social messaging system 130. The social messaging system 130 is generally based on a three-tiered architecture, consisting of an interface layer 124, an application logic layer 126, and a data layer 128. As is understood by skilled artisans in the relevant computer and Internet-related arts, each component or engine shown in FIG. 1 represents a set of executable software instructions and the corresponding hardware (e.g., memory and processor) for executing the instructions, forming a hardware-implemented component or engine and acting, at the time of the execution of instructions, as a special purpose machine configured to carry out a particular set of functions. To avoid obscuring the inventive subject matter with unnecessary detail, various functional components and engines that are not germane to conveying an understanding of the inventive subject matter have been omitted from FIG. 1. Of course, additional functional components and engines may be used with a social messaging system, such as that illustrated in FIG. 1, to facilitate additional functionality that is not specifically described herein. Furthermore, the various functional components and engines depicted in FIG. 1 may reside on a single server computer or client device, or may be distributed across several server computers or client devices in various arrangements. Moreover, although the social messaging system 130 is depicted in FIG. 1 as a three-tiered architecture, the inventive subject matter is by no means limited to such an architecture.

As shown in FIG. 1, the interface layer 124 consists of interface component(s) (e.g., a web server) 140, which receives requests from various client-computing devices and servers, such as client device 110 executing client application(s) 112, and third party server(s) 120 executing third party application(s) 122. In response to received requests, the interface component(s) 140 communicates appropriate responses to requesting devices via a network 104. For example, the interface component(s) 140 can receive requests such as Hypertext Transfer Protocol (HTTP) requests, or other web-based, Application Programming Interface (API) requests.

The client device 110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). Further, in some example embodiments, the client device 110 forms all or part of an ideogram generation system 160 such that components of the ideogram generation system 160 configure the client device 110 to perform a specific set of functions with respect to operations of the ideogram generation system 160.

In an example, the client device 110 is executing the client application(s) 112. The client application(s) 112 can provide functionality to present information to a user 106 and communicate via the network 104 to exchange information with the social messaging system 130. Further, in some examples, the client device 110 executes functionality of the ideogram generation system 160 to segment images of video streams during capture of the video streams and transmits the video streams (e.g., with image data modified based on the segmented images of the video stream) or generates image representations (e.g., ideograms) from data included in the video stream.

Each client device 110 can comprise a computing device that includes at least a display and communication capabilities with the network 104 to access the social messaging system 130, other client devices, and third party server(s) 120. Client devices 110 comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. User 106 can be a person, a machine, or other means of interacting with the client device 110. In some embodiments, the user 106 interacts with the social messaging system 130 via the client device 110. The user 106 may not be part of the networked system 100, but may be associated with the client devices 110.

As shown in FIG. 1, the data layer 128 has database server(s) 132 that facilitate access to information storage repositories or database(s) 134. The database(s) 134 are storage devices that store data such as member profile data, social graph data (e.g., relationships between members of the social messaging system 130), image modification preference data, accessibility data, and other user data.

An individual can register with the social messaging system 130 to become a member of the social messaging system 130. Once registered, a member can form social network relationships (e.g., friends, followers, or contacts) on the social messaging system 130 and interact with a broad range of applications provided by the social messaging system 130.

The application logic layer 126 includes various application logic components 150, which, in conjunction with the interface component(s) 140, generate various user interfaces with data retrieved from various data sources or data services in the data layer 128. Individual application logic components 150 may be used to implement the functionality associated with various applications, services, and features of the social messaging system 130. For instance, a social messaging application can be implemented with at least a portion of the application logic components 150. The social messaging application provides a messaging mechanism for users of the client devices 110 to send and receive messages that include text and media content such as pictures and video. The client devices 110 may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application logic components 150.

As illustrated in FIG. 1, the social messaging system 130 may include at least a portion of the ideogram generation system 160 capable of identifying, tracking, and modifying video data during capture of the video data by the client device 110. Similarly, the client device 110 includes at least a portion of the ideogram generation system 160, as described above. In other examples, client device 110 may include the entirety of ideogram generation system 160. In instances where the client device 110 includes a portion of (or all of) the ideogram generation system 160, the client device 110 can work alone or in cooperation with the social messaging system 130 to provide the functionality of the ideogram generation system 160 described herein.

In some embodiments, the social messaging system 130 may be an ephemeral message system that enables ephemeral communications where content (e.g., video clips or images) are deleted following a deletion trigger event such as a viewing time or viewing completion. In such embodiments, a device uses the various components described herein within the context of any of generating, sending, receiving, or displaying aspects of an ephemeral message. For example, a device implementing the ideogram generation system 160 may identify, track, and modify an object of interest, such as pixels representing skin on a face depicted in the video clip. The device may modify the object of interest during capture of the video clip without image processing after capture of the video clip as a part of a generation of content for an ephemeral message.

Figure 2:
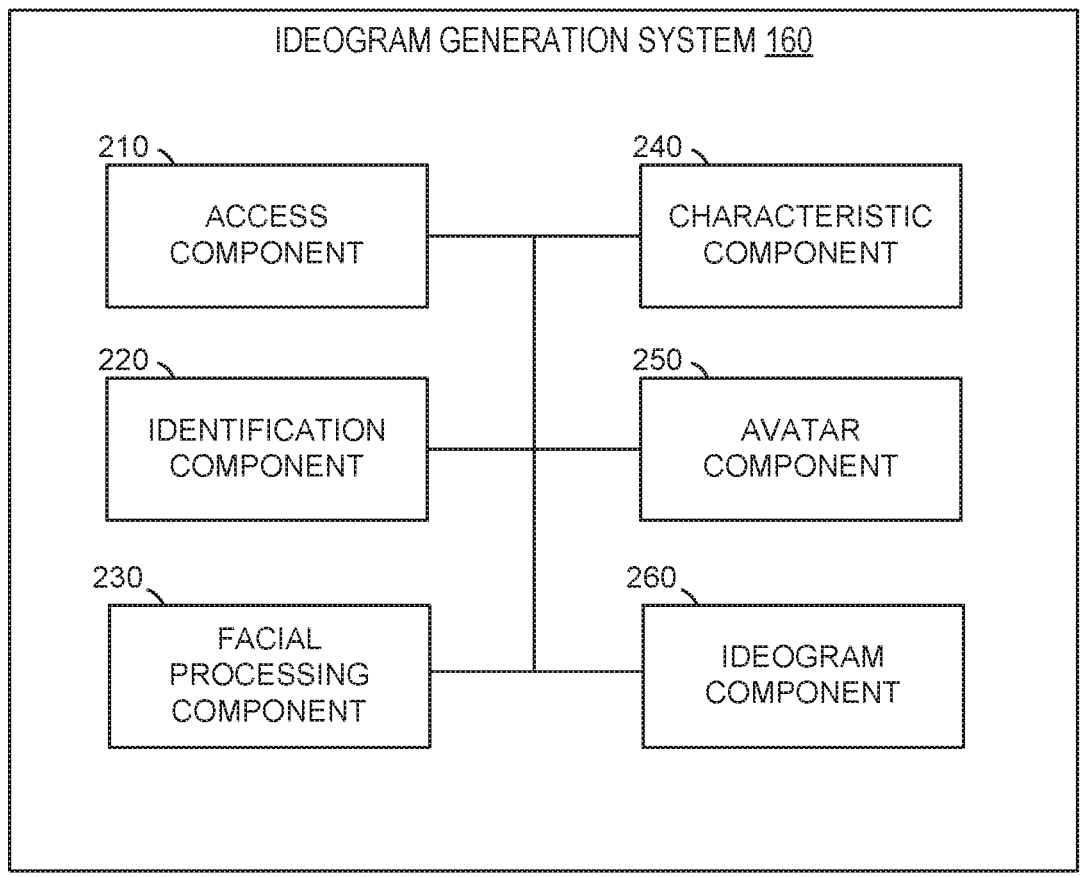
FIG. 2 is a diagram illustrating an ideogram generation system, according to some example embodiments.

In FIG. 2, in various embodiments, the ideogram generation system 160 can be implemented as a standalone system or implemented in conjunction with the client device 110, and is not necessarily included in the social messaging system 130. The ideogram generation system 160 is shown to include an access component 210, an identification component 220, a facial processing component 230, a characteristic component 240, an avatar component 250, and an ideogram component 260. All, or some, of the components 210-260, communicate with each other, for example, via a network coupling, shared memory, and the like. Each component of components 210-260 can be implemented as a single component, combined into other components, or further subdivided into multiple components. Other components not pertinent to example embodiments can also be included, but are not shown.

The access component 210 accesses or otherwise retrieves images captured by an image capture device or otherwise received by or stored in the client device 110. In some instances, the access component 210 may include portions or all of an image capture component configured to cause an image capture device of the client device 110 to capture images based on user interaction with a user interface presented on a display device of the client device 110. The access component 210 may pass images or portions of images to one or more other components of the ideogram generation system 160.

The identification component 220 identifies faces or other areas of interest within the image or set of images received from the access component 210. In some embodiments, the identification component 220 tracks the identified face or areas of interest across multiple images of a set of images (e.g., a video stream). The identification component 220 may pass values (e.g., coordinates within the image or portions of the image) representing the face or areas of interest to one or more components of the ideogram generation system 160.

The facial processing component 230 identifies facial landmarks depicted on the face or within the areas of interest identified by the identification component 220. In some embodiments, the facial processing component 230 identifies expected but missing facial landmarks in addition to the facial landmarks which are depicted on the face or within the area of interest. The facial processing component 230 may determine an orientation of the face based on the facial landmarks and may identify one or more relationships between the facial landmarks. The facial processing component 230 may pass values representing the facial landmarks to one or more components of the ideogram generation system 160.

The characteristic component 240 identifies, determines, or measures one or more characteristics of the face within the image or areas of interest based at least in part on the facial landmarks identified by the facial processing component 230. In some embodiments, the characteristic component 240 identifies facial features based on the facial landmarks. The characteristic component 240 may determine measurements of the identified facial features and distances extending between two or more facial features. In some embodiments, the characteristic component 240 identifies areas of interest and extracts prevailing colors from the areas of interest identified on the face. The characteristic component 240 may pass values representing the one or more characteristics to the avatar component 250.

The avatar component 250 generates an avatar or facial representation based on the one or more characteristics received from the characteristic component 240. In some embodiments, the avatar component 250 generates a stylized representation of the face, such as a cartoon version of the face depicted within the image. The stylized representation may be generated such that the proportions, positions, and prevailing colors of the features identified within the face are matched to the stylized representation. In some embodiments, in order to match the proportions, positions, and prevailing colors, the avatar component 250 independently generates facial feature representations or modifies existing template representations to match the characteristics and facial features identified by the characteristic component 240. The avatar component 250 may cause presentation of the finished avatar of a facial representation at a display device of the client device 110. In some embodiments, the avatar component 250 enables generation of graphics using the generated avatar or facial representation such as stickers, emojis, .gifs, and other suitable graphics configured for transmission within a message (e.g., text, short message system messages, instant messages, and temporary messages) to a subsequent client device associated with a subsequent user.

The ideogram component 260 positions graphical elements and a graphical model to generate an ideogram. In some embodiments, the ideogram component 260 positions one or more graphical elements and the graphical model with respect to one another. The ideogram component 260 may also resize one or more of the one or more graphical elements and the graphical model. The ideogram component 260 may resize graphical elements and the graphical model to fit within dimensions of ideograms for a target application.

Figure 3:
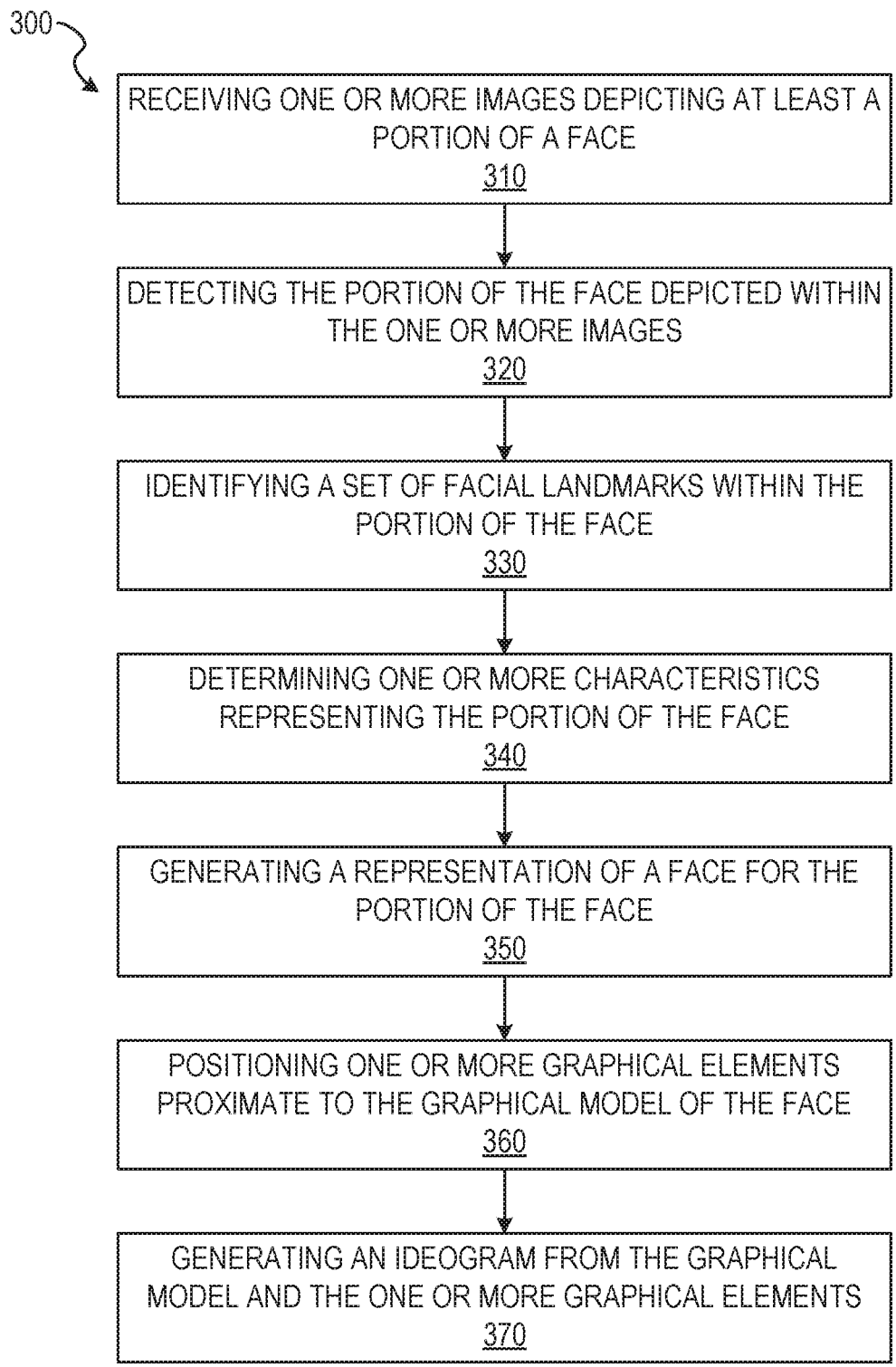
FIG. 3 is a flow diagram illustrating an example method for generating an ideogram from a set of images of an image stream, according to some example embodiments.

FIG. 3 depicts a flow diagram illustrating an example method 300 for generating ideograms from a set of images received in an image stream. The operations of method 300 may be performed by components of the ideogram generation system 160, and are so described below for purposes of illustration.

In operation 310, the access component 210 receives or otherwise accesses one or more images depicting at least a portion of a face. In some embodiments, the access component 210 receives the one or more images as a video stream captured by an image capture device associated with the client device 110 and presented on a user interface of an avatar generation application. The access component 210 may include the image capture device as a portion of hardware comprising the access component 210. In these embodiments, the access component 210 directly receives the one or more images or the video stream captured by the image capture device. In some instances, the access component 210 passes all or a part of the one or more images or the video stream (e.g., a set of images comprising the video stream) to one or more components of the ideogram generation system 160, as described below in more detail.

In operation 320, the identification component 220 detects the portion of the face depicted within the one or more images. In some embodiments, the identification component 220 includes a set of face tracking operations to identify a face or a portion of a face within the one or more images. The identification component 220 may use the Viola-Jones object detection framework, Eigen-face technique, a genetic algorithm for face detection, edge detection methods, or any other suitable object-class detection method or set of operations to identify the face or portion of the face within the one or more images. Where the one or more images are a plurality of images (e.g., a set of images in a video stream) the face tracking operations of the identification component 220, after identifying the face or portion of the face in an initial image, may identify changes in position of the face across multiple images of the plurality of images, thereby tracking movement of the face within the plurality of images. Although specific techniques are described, it should be understood that the identification component 220 may use any suitable technique or set of operations to identify the face or portion of the face within the one or more images without departing from the scope of the present disclosure.

In operation 330, the facial processing component 230 identifies a set of facial landmarks within the portion of the face depicted within the one or more images. In some embodiments, the facial processing component 230 identifies the set of facial landmarks within the portion of the face in a subset of the one or more images. For example, the facial processing component 230 may identify the set of facial landmarks in a set of images (e.g., a first set of images) of a plurality of images, where the portion of the face or the facial landmarks appear in the set of images but not in the remaining images of the plurality of images (e.g., a second set of images). In some embodiments, identification of the facial landmarks may be performed as a sub-operation or part of identification of the face or portion of the face using face tracking operations incorporating the detection operations described above.

In operation 340, the characteristic component 240 determines one or more characteristics representing the portion of the face depicted in the one or more images. In some embodiments, the operation 340 is performed in response to detecting the portion of the face, in the operation 320, and the set of facial landmarks, in the operation 330. Characteristics representing the portion of the face may include presence or absence of one or more features (e.g., an eye, an eyebrow, a nose, a mouth, and a perimeter of a face) depicted on the portion of the face, relative positions of the one or more features (e.g., positions of features relative to one another or relative to an outline of the portion of the face), measuring portions of the one or more features, and measuring distances between the two or more of the features. In some instances, characteristics of the portion of the face include color of the one or more features depicted on the face, relative color between an area of the portion of the face and one or more features depicted on the portion of the face, presence or absence of an obstruction, presence or absence of hair, presence or absence of a shadow, or any other suitable characteristics of the portion of the face.

Figure 4:
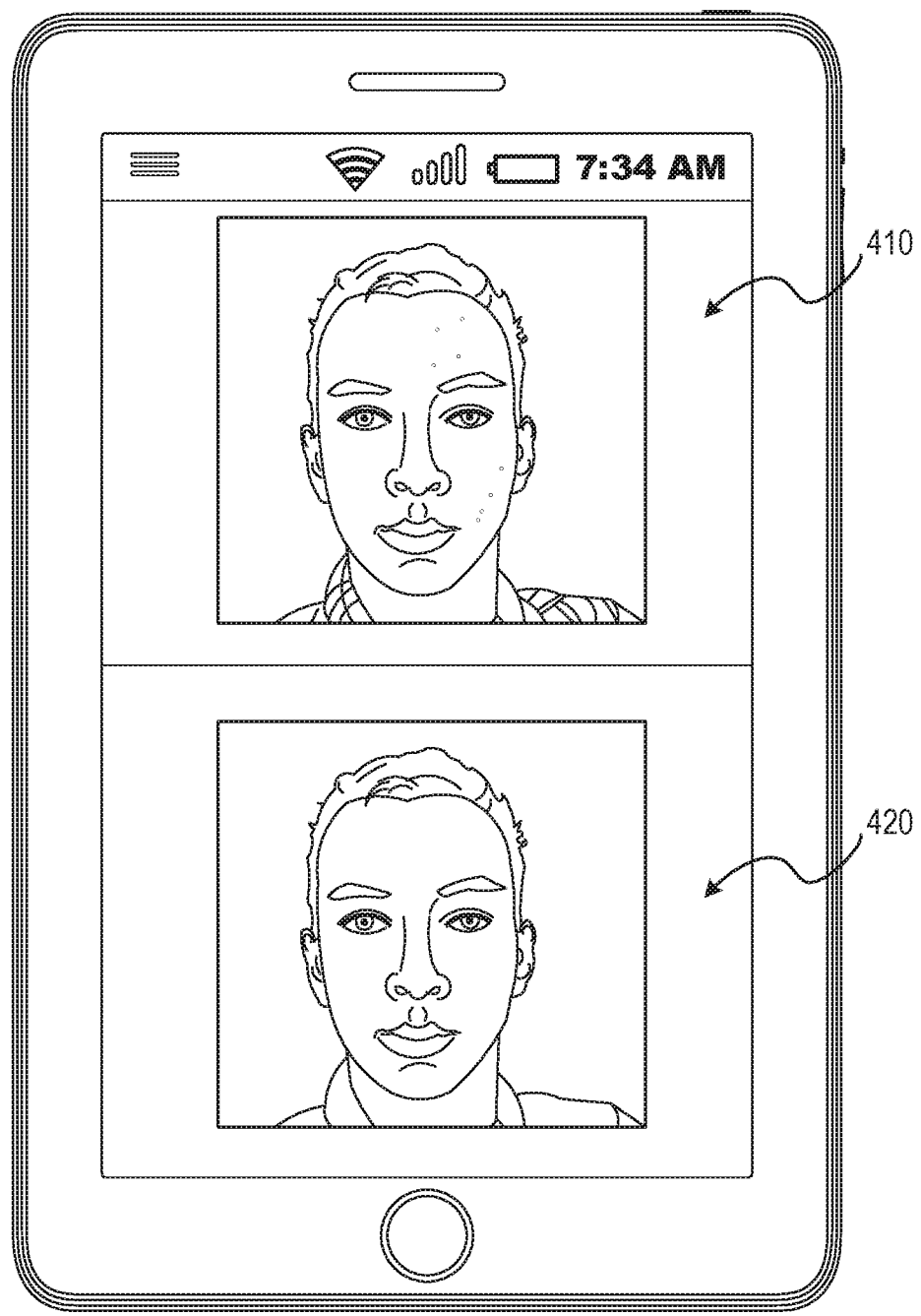
FIG. 4 is a user interface diagram depicting a face within a video stream and a generated graphical model.

In operation 350, the avatar component 250 generates a graphical model of a face for the at least one portion of the face depicted in the one or more images. In some embodiments, the operation 350 is performed based on (e.g., in response to) the one or more characteristics being determined in the operation 340 and the set of facial landmarks being identified in the operation 330. Where the characteristics include one or more measurements for the one or more features depicted on the portion of the face, the avatar component 250 may generate the graphical model of the face by rendering a base face and head shape according to the characteristics and the one or more measurements. As shown in FIG. 4, the avatar component 250 may then generate the one or more features depicted on the face 410 and apply the one or more generated features to the base face and head shape to generate the graphical model 420. Each of the one or more features may be generated to match one or more measurements associated with the specified feature. As shown in FIG. 4, once generated, one or more of the face 410 and the graphical model 420 may be presented or otherwise displayed on the client device 110.

In operation 360, the ideogram component 260 positions one or more graphical elements proximate to the graphical model of the face. The one or more graphical elements may be images, filters, animations (e.g., animated graphics or images), symbols, words, or scenes. The one or more graphical elements may be selected from a set of graphical elements. In some instances, the one or more graphical elements are selected by the ideogram component 260. In some embodiments, the ideogram component 260 receives selection of user interface elements representing the one or more graphical elements. Selection of the user interface elements may cause the ideogram component 260 to retrieve the one or more graphical elements from a database containing the set of graphical elements.

Where the one or more graphical elements are selected by the ideogram component 260, the ideogram component 260 may select the one or more graphical elements based on an interaction received at the client device 110. For example, the access component 210 may receive a selection of a user interface element. The user interface element may be an icon, an entry in a list, or other representation of the one or more graphical elements. In some embodiments, the user interface element represents a theme or predefined group of graphical elements. For example, the user interface element may represent a "Happy Birthday" ideogram. The "Happy Birthday" ideogram may include a first graphical element of balloons and a second graphical element with lettering spelling out "Happy Birthday." Upon receiving selection of the user interface element for the "Happy Birthday" ideogram, the ideogram component 260 may select the first graphical element and the second graphical element from the set of graphical elements stored on a database. The ideogram component 260 may then position the first graphical element and the second graphical element proximate to the graphical model.

Where the ideogram component 260 receives selection of user interface elements of the one or more graphical element, the ideogram component 260 may initially cause presentation of a set of graphical elements. The ideogram component 260 may receive selections of the one or more graphical elements included in the set of graphical elements. For example, a user of the client device 110 may be presented with the set of graphical elements in a grid or other ordered presentation at a display device of the client device 110. The user may tap, touch, click, or otherwise select the one or more graphical elements, causing the client device 110 to pass an indication of the selection to the ideogram component 260. In some embodiments, the ideogram component 260 may position the one or more graphical elements proximate to the graphical model based on position data of the one or more graphical elements.

In some instances, the ideogram component 260 may receive a position selection indicating placement of the one or more graphical elements with respect to the graphical model. For example, the user may drag the one or more graphical elements to positions proximate to the graphical model using a mouse, keyboard commands, or a touch screen. The positions selected by the user may be predetermined optional positions or may be freely selected by the user. By way of example, upon selection of the one or more graphical elements, the ideogram component 260 may generate instructions for available positions, among the predetermined optional positions, for each of the one or more graphical elements. The instructions may be text instructions, one or more outlines of a graphical element proximate to the graphical model, or any other suitable instruction or indication of a position at which a graphical element may be placed. The user may position the one or more graphical elements, based on the instructions, using a display device and a user input component (e.g., keyboard, mouse, or touch screen). Positioning of the one or more graphical elements causes the client device 110 to pass the positions or data representing the positions to the ideogram component 260, and the ideogram component 260 may apply or temporarily store the selected positions.

Figure 5:
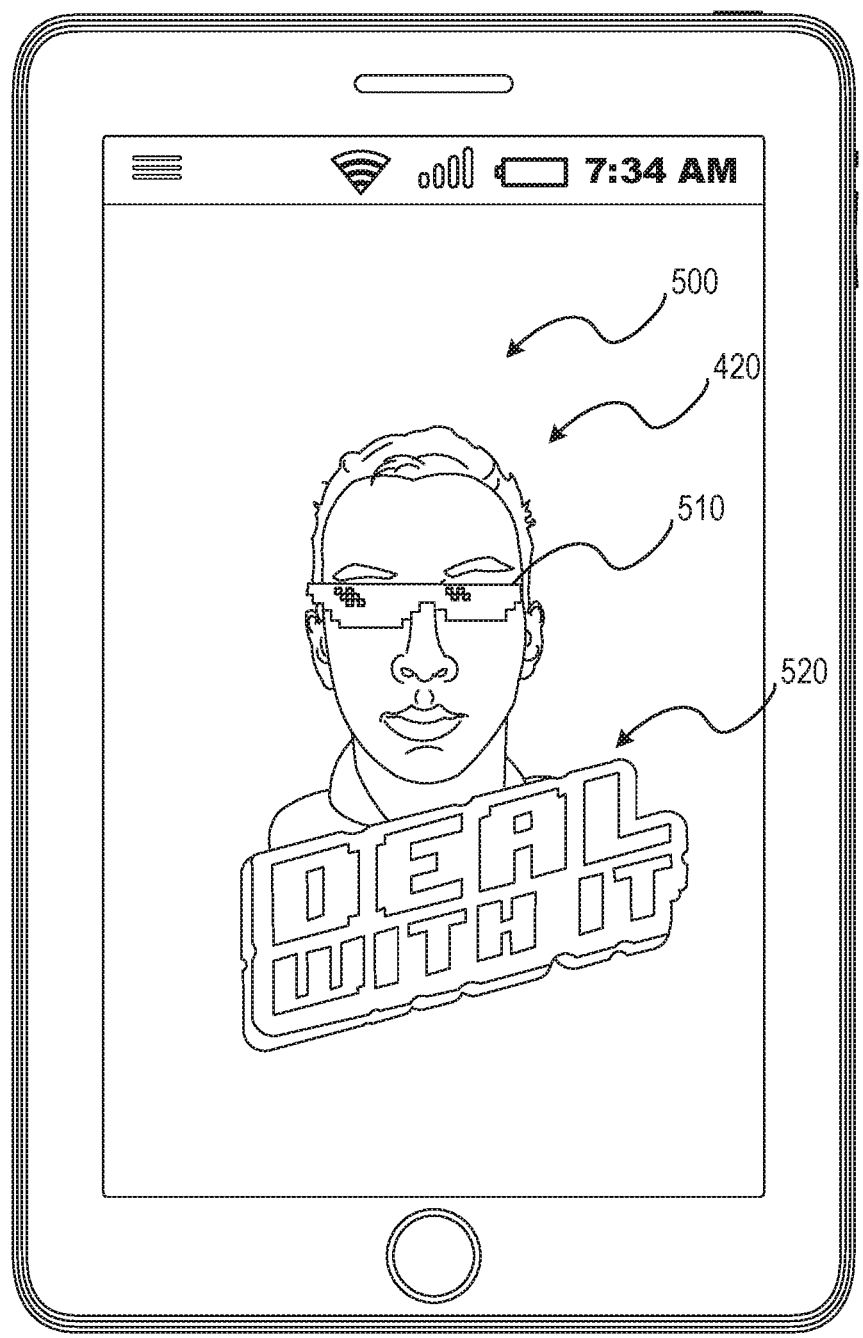
FIG. 5 is a user interface diagram depicting an ideogram generated from a graphical model.

In operation 370, the ideogram component 260 generates an ideogram from the graphical model and the one or more graphical elements. As shown in FIG. 5, the ideogram 500 may be generated as including the graphical model 420 and the one or more graphical elements 510 and 520. The ideogram 500 may be generated as a digital sticker, an emoji, an image, or any other suitable ideogram. The ideogram component 260 may generate the ideogram 500 by combining the graphical model 420 and the one or more graphical elements 510, 520 into a single layered or unlayered ideogram 500. The ideogram 500 may be generated by inserting the graphical model 420 into a template graphic including the one or more graphical elements 510, 520. In these instances, the graphical model 420 may be inserted into a predetermined position with respect to the one or more graphical elements 510, 520. In some instances, the ideogram 500 may be animated such that one or more of the one or more graphical elements 510, 520 and the graphical model 500 move with respect to another of the graphical elements 510, 520 or the graphical model 420. For example, the ideogram 500 may be generated such that a first graphical element (e.g., 510) and the graphical model 420 are animated (e.g., move between one or more predetermined positions) with respect to a second graphical element (e.g., 520). In some embodiments, animated ideograms may be generated using a set of graphical models in a stream of individual graphical model poses or positions.

In some instances, the ideogram component 260 generates the ideogram (e.g., ideogram 500) irrespective of dimensions or configuration information of any specific program, application, or set of instructions outside of the ideogram generation system 160. For example, the ideogram component 260 may generate the ideogram with dimensions (e.g., height and width dimensions, pixel dimensions, or total pixel count) suitable for the ideogram generation system 160 without regard to another application which may use or receive the ideogram. In some instances, the ideogram may be generated using universal configuration information suitable for use across a set of applications (e.g., web browsers, messaging applications, social networking applications, or ephemeral messaging applications). As will be explained below in more detail, the ideogram component 260 may generate the ideogram based on configuration information of a specified destination application. For example, the ideogram may be generated with dimensions and formatting compliant with a specified messaging or social networking application selected by a user or predetermined at initiation of the ideogram generation system 160.

In some example embodiments, as part of operation 370, the ideogram component 260 determines one or more sizes of the one or more graphical elements (e.g., graphical elements 510, 520). The ideogram component 260 then scales the graphical model (e.g., graphical model 420) to generate a scaled graphical model based on the one or more sizes of the one or more graphical elements. In some embodiments, the ideogram component 260 may identify a maximum size of the ideogram and scale one or more of the graphical elements and the graphical model to fit within the maximum size, such that the one or more graphical elements and the graphical model maintain the same or similar relative proportions before and after the scaling. The ideogram component 260 may scale the graphical model and the one or more graphical elements by subsampling or downsampling the graphical model or the one or more graphical elements being scaled. Although described as using downsampling, it should be understood that the ideogram component 260 may use any suitable digital image scaling process, technique, algorithm, or operations suitable to reduce the size of one or more of the graphical model and the one or more graphical elements.

In some embodiments, the ideogram component 260 generates the ideogram by performing a set of ideogram generation operations to render the ideogram from the graphical model and the one or more graphical elements. The ideogram component 260 may first generate an alpha mask. In generating the alpha mask, the ideogram component 260 renders a mesh for the graphical model in a first color on a background having a second color. The first color and the second color may be selected based on a contrast value between the first color and the second color. For example, the first color may be white and the second color may be black. The alpha mask may represent the graphical model bounded within an outline of the graphical model such that generation of the alpha mask may be a silhouette of the graphical model colored in the first color and positioned on a background of the second color.

In response to generating the alpha mask, the ideogram component 260 generates a graphical model texture. In generating the graphical model texture, the ideogram component 260 renders the graphical model mesh using one or more shading operations. The shading operations may include skin shading, eye shading, hair shading, and other shading operations. In some embodiments, the one or more shading operations are Open Graphics Library (OPENGL) shading operations or are compatible with usage of OPENGL sample coverage features.

After generating the graphical model texture, the ideogram component 260 generates the ideogram from the graphical model, including the generated graphical model texture, the alpha mask, and the one or more graphical elements. In some embodiments, the ideogram component 260 renders the ideogram with a sticker shader function. The sticker shader function may receive texture inputs for layers. In some instances the sticker shader receives texture inputs including the graphical model texture, the alpha mask, and the one or more graphical elements.

In some embodiments, the sticker shader receives texture inputs including the graphical model texture, the alpha mask, and one or more elements for ideogram layers. The elements for the ideogram layers may include a sticker mask layer, a sticker background layer, and a sticker foreground layer. The sticker mask layer, the sticker background layer, and the sticker foreground layer may be variable layers which may or may not be included in a generated ideogram. The variable sticker layers may be included in the generated ideogram where a graphical element corresponds to the sticker layer to be included.

In some embodiments, the ideogram component 260, in performing the sticker shader function, determines red, green, and blue (RGB) components (e.g., pixel values) from the graphical model texture. The ideogram component 260 may also determine an alpha value (e.g., a pixel value) from a red channel of the alpha mask. Where the ideogram component 260 determines that the sticker mask layer will be included in the ideogram, the ideogram component 260 modifies the alpha mask by the sticker mask layer. Where the ideogram component 260 determines the sticker background layer will be included in the ideogram, the ideogram component 260 blends alpha values of a graphical element in the sticker background with that of the alpha mask layer or the graphical model texture. Where the ideogram component 260 determines the sticker foreground layer will be included in the ideogram, the ideogram component 260 blends alpha values of a graphical element in the sticker foreground with the alpha values of the alpha mask layer or the graphical model texture.

Figure 6:
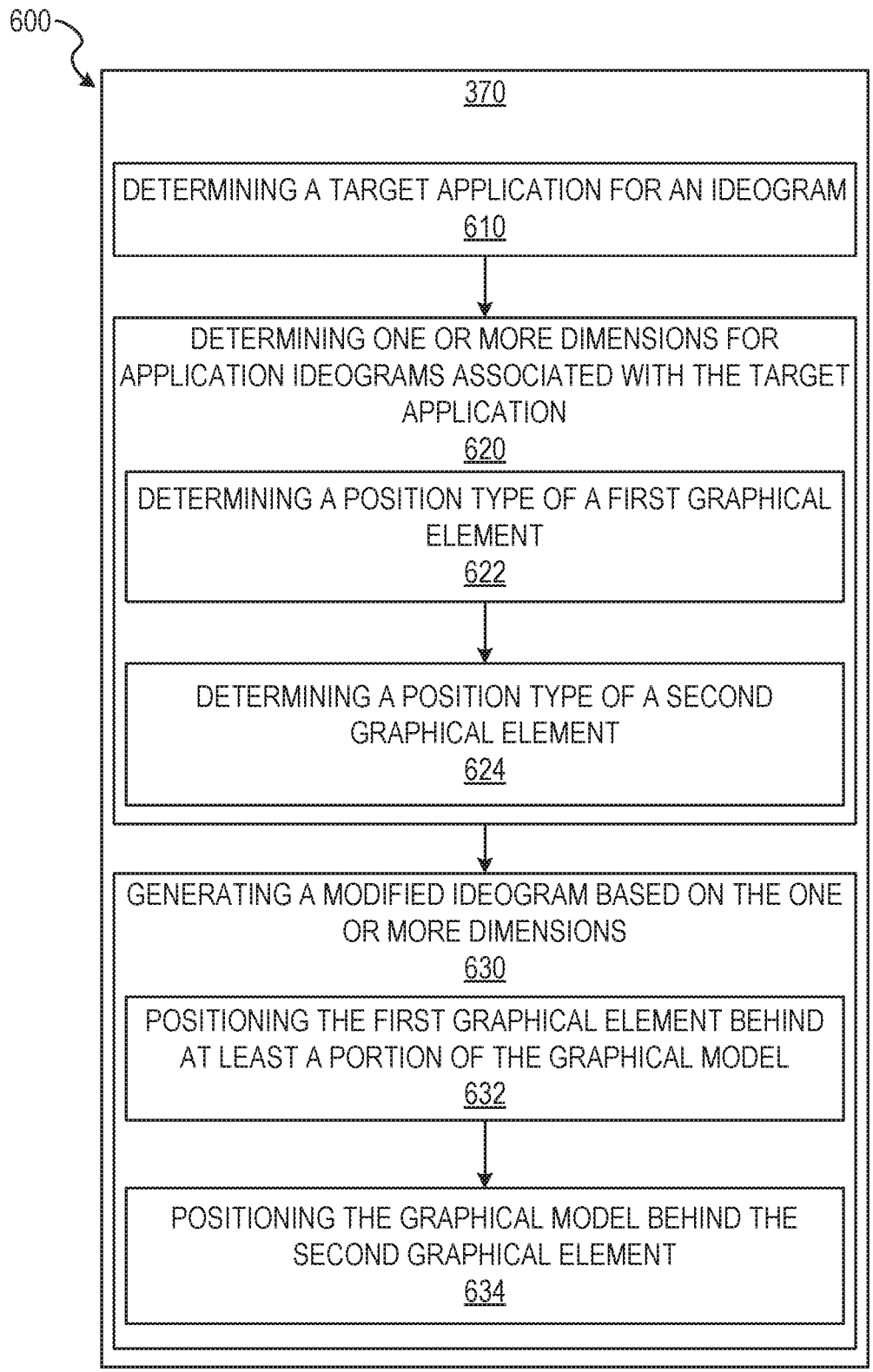
FIG. 6 is a flow diagram illustrating an example method for generating an ideogram from a set of images of an image stream, according to some example embodiments.

FIG. 6 depicts a flow diagram illustrating an example method 600 for generating an ideogram from a set of images of an image stream. The operations of method 600 may be performed by components of the ideogram generation system 160. In some instances, certain operations of the method 600 may be performed using one or more operations of the method 300 or as sub-operations of one or more operations of the method 300, as will be explained in more detail below.

In some example embodiments, in response to initiating operation 370, in operation 610, the ideogram component 260 determines a target application for the ideogram. The ideogram component 260 may determine the target application based on user interactions with the client device 110, interactions among applications stored on or currently being processed by at least one processor of the client device 110, or any other suitable manner. In some instances, the ideogram component 260 determines a target application based on a hand-off initiating the ideogram generation system 160 or the method 300. For example, a user may interact with a first application presented at the client device 110. During the interaction with the first application, the user may select a user interface element for generating a new, unique, or tailored ideogram. The first application may initiate a hand-off to the ideogram generation system 160 or one or more components of the ideogram generation system 160. The target application may be determined as an application which initiates a hand-off to the ideogram generation system 160 for creation of an ideogram.

In some example embodiments, the ideogram component 260 determines the target application for the ideogram based on an application accessing an ideogram library. The ideogram library may contain one or more previously generated ideogram, a previously generated graphical model, and one or more graphical elements for addition to the graphical model in creating ideograms. The ideogram library may be linked to the ideogram component 260 such that accessing the ideogram library causes initiation of operation 610. For example, the ideogram library may be accessed through the ideogram component 260 by the application. Although described with specified examples, it should be understood that the ideogram component 260 may use any suitable algorithm, method, or set of operations to identify a target application for which an ideogram is to be generated or in which an ideogram is to be used.

In operation 620, the ideogram component 260 determines one or more dimensions for application ideograms associated with the target application. The one or more dimensions of the application ideograms may be length and width dimensions, diagonal measurement dimensions, pixel measurements (e.g., length, width, or diagonal measurements), pixel counts, or any other suitable dimension. The one or more dimensions for application ideograms may indicate one or more of a minimum size and a maximum size for application ideograms presented within the target application.

In some example embodiments, where an ideogram is being created for use in a target application, the one or more dimensions for application ideograms include position type dimensions. The position type dimensions may represent one or more of a minimum size and a maximum size for graphical elements used in a predetermined position type within an ideogram. The position type may be a foreground position, a background position, and a medial position between the background position and the foreground position. In some instances, the one or more dimensions may include a location within the application ideogram. For example, some foreground graphical elements may be limited to one or more specified positions within a foreground of an application ideogram and a background graphical element may be limited to one or more specified positions within a background of the application ideogram.

In operation 622, the ideogram component 260 determines that the position type of a first graphical element is a background type. In some embodiments, based on determining one or more dimensions (e.g., position type dimensions), the ideogram component 260 determines the position types of graphical elements to be included in a generated ideogram. The ideogram component 260 may determine a position type of a graphical element based on identifying a position indication within metadata associated with the graphical element (e.g., the first graphical element). The metadata may indicate whether the graphical element is configured to be positioned in a background, a foreground, or a medial position. In some embodiments, the ideogram component 260 may dynamically determine the position type for a graphical element by matching size, shape, dimensions, or content of the graphical element with size, shape, dimensions, or content characteristics of a specified position type. For example, a background type may have a first predefined size, shape, and dimension characteristic (e.g., a square having the maximum size and dimensions of an application ideogram), while foreground type may have a second predefined size, shape, and dimension characteristic. A graphical element having characteristics matching the first predefined size, shape, and dimension characteristics may be determined to be a background type.

In some instances, where the ideogram component 260 identifies a position type based on content of the graphical element, the ideogram component 260 may identify a content based on metadata for the graphical element, image recognition operations applied to the graphical element, or the title of the graphical element. The ideogram component 260 may match the identified content of the graphical element to a set of content types associated with the background type, the foreground type, or the medial position type. For example, where the graphical element depicts scenery with palm trees and a sunset, the ideogram component 260 may identify the content for the graphical element as scenery. The ideogram component 260 may then parse metadata or description data associated with the background type, the foreground type, and the medial position type to determine which type is associated with scenery. In this example, the ideogram component 260 may identify the scenery graphical element as a background type by determining that the keyword "scenery" is associated with the background type.

In operation 624, the ideogram component 260 determines that the position type of a second graphical element is a foreground type. The ideogram component 260 may determine the position type of the second graphical element in a manner similar to or the same as described with respect to operation 622. Although described as determining position types for a first graphical element and a second graphical element having distinct position types, it should be understood that the ideogram component 260 may determine position types for any number of graphical elements and may determine more than one graphical element to be positioned in a single position type.

In operation 630, the ideogram component 260 generates a modified ideogram based on the one or more dimensions. In embodiments where the ideogram was previously generated, the ideogram component 260 modifies the existing ideogram based on the one or more dimensions identified in operation 620. The ideogram component 260 may modify the existing ideogram by reducing the dimensions of the existing ideogram to be within the one or more dimensions (e.g., maximum dimensions) identified in operation 620. In modifying the existing ideogram, the ideogram component 260 may retain an aspect ratio or proportion of the existing ideogram to prevent the existing ideogram from being skewed during the modification. In embodiments where the ideogram is being generated, the ideogram component 260 may modify one or more of the graphical elements and the graphical model included in the ideogram based on the dimensions identified in operation 620. In these instances, the ideogram component 260 also positions the graphical model and the one or more graphical elements based, at least in part, on the dimensions identified in operation 620.

In operation 632, in generating the ideogram, the ideogram component 260 positions the first graphical element, identified as a background type, behind at least a portion of the graphical model. In some instances, the ideogram component 260 positions the first graphical element such that the portion of the graphical model obstructs at least a portion of the graphical element. The ideogram component 260 may also modify a size (e.g., one or more dimensions or measurements) of the first graphical element based on the one or more dimensions identified in operation 620. The ideogram component 260 may position the first graphical element behind the portion of the graphical model by generating a layered image file and assigning or otherwise placing the first graphical element in a first layer or base layer. The ideogram component 260 may then place the graphical model in a second layer above the first layer such that a portion of the graphical element obscures a portion of the first graphical element.

In operation 634, the ideogram component 260 positions the graphical model behind the second graphical element such that the graphical element obstructs the portion of one or more of the graphical model and the first graphical element. The ideogram component 260 may also modify a size (e.g., one or more dimensions or measurements) of the second graphical element based on the one or more dimensions identified in operation 620. The ideogram component 260 may position the second graphical element in front of the portion of the graphical model by applying the second graphical element to the layered image file, assigning or otherwise placing the second graphical element in a third layer above the second layer including the graphical model. In some embodiments, the ideogram component 260 may then flatten or otherwise render the layered image file into the ideogram.

Figure 7:
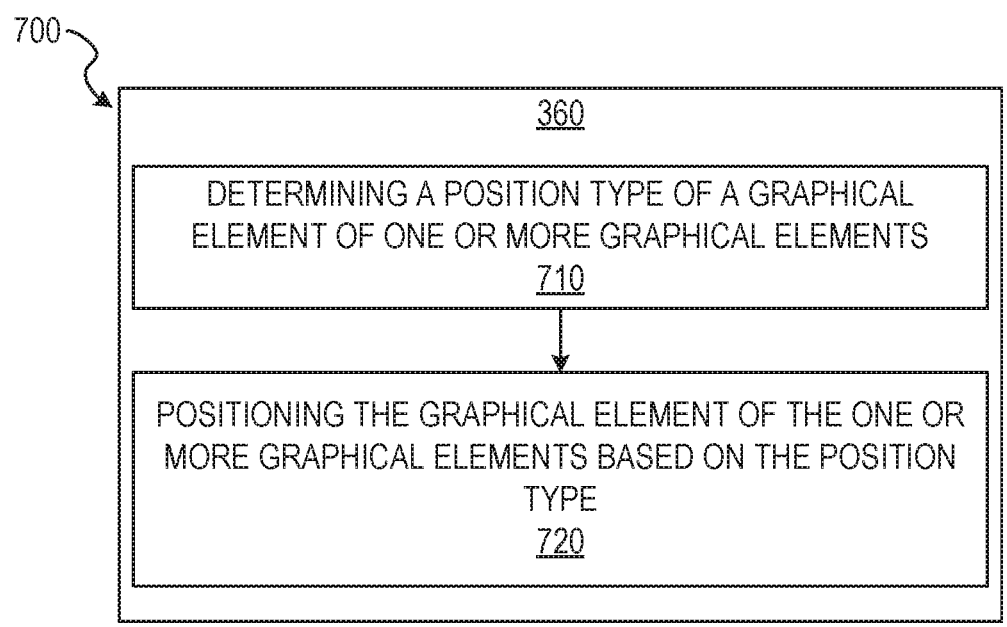
FIG. 7 is a flow diagram illustrating an example method for generating an ideogram from a set of images of an image stream, according to some example embodiments.

FIG. 7 depicts a flow diagram illustrating an example method 700 for generating an ideogram from a set of images of an image stream. The operations of method 700 may be performed by components of the ideogram generation system 160. In some instances, certain operations of the method 700 may be performed using one or more operations of the method 300 or as sub-operations of one or more operations of the method 300, as will be explained in more detail below.

In some example embodiments, as a part of operation 360, in operation 710, the ideogram component 260 determines a position type of a graphical element of the one or more graphical elements. The position type may be determined similarly to or the same as the manner described in operations 622 and 624. The position type may be a foreground position, a background position, or a medial position between the foreground and the background. In some embodiments, operation 710 may be performed in modifying an existing ideogram to include an additional graphical element.

In operation 720, the ideogram component 260 positions the graphical element based on the position type of the graphical element. The ideogram component 260 may position the graphical element similarly to or the same as the manner described above in operations 632 and 634. In embodiments where the operations 710 and 720 are performed with respect to an existing ideogram, the ideogram component 260 may position the graphical element in an image layer. The ideogram component 260 may position the graphical element in an existing image layer of an ideogram generated from a layered image file or may generate a new image layer. In some instances, the ideogram component 260 may generate a new layered image file with a first image layer including the existing ideogram. The ideogram component 260 position the graphical element in a second image layer, above or below the first image layer, and generate a new ideogram from the combination of the existing ideogram and the graphical element. The new ideogram may be flattened or otherwise rendered into the new ideogram from the new layered image or the layered image used to generate the existing ideogram.

Figure 8:
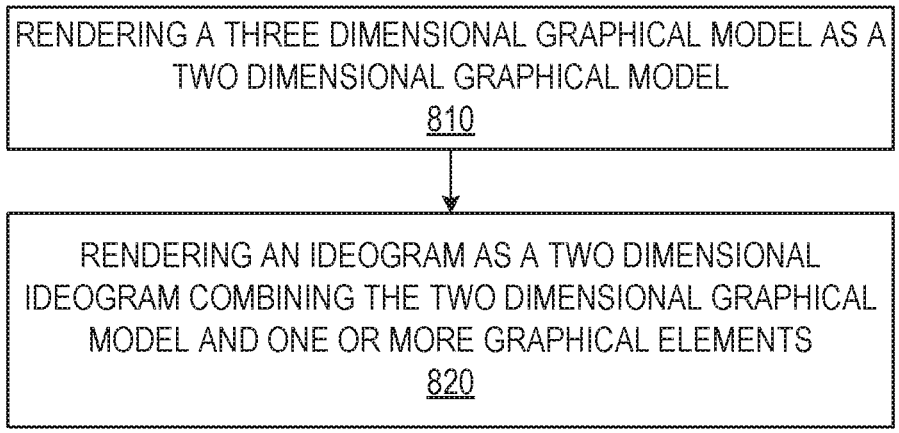
FIG. 8 is a flow diagram illustrating an example method for generating an ideogram from a set of images of an image stream, according to some example embodiments.

FIG. 8 depicts a flow diagram illustrating an example method 800 for generating an ideogram from a set of images of an image stream. The operations of method 800 may be performed by components of the ideogram generation system 160. In some instances, certain operations of the method 800 may be performed using one or more operations of the method 300 or as sub-operations of one or more operations of the method 300, as will be explained in more detail below.

In some example embodiments, in operation 810, the ideogram component 260 renders the graphical model. The graphical model may be a three-dimensional graphical model and the one or more graphical elements may be two-dimensional graphical elements. In instances where the graphical model is a three-dimensional graphical model in operation 810, the ideogram component 260 renders the three-dimensional graphical model as a two-dimensional graphical model in response to positioning the one or more graphical elements. The ideogram component 260 may render the three-dimensional graphical model using a flattening process, generating an image file from a depicted view of the three-dimensional graphical model, or any other suitable method.

In operation 820, the ideogram component 260 renders the ideogram as a two-dimensional ideogram combining the two-dimensional graphical model and the one or more graphical elements. The ideogram component 260 may render the ideogram as a two-dimensional ideogram by generating a layered image and placing each of the one or more graphical elements and the two-dimensional graphical model in layers within the layered image. For example, the ideogram component 260 may assign or otherwise place each of the one or more graphical elements and the two-dimensional graphical model in separate layers within the layered image.

Figure 9:
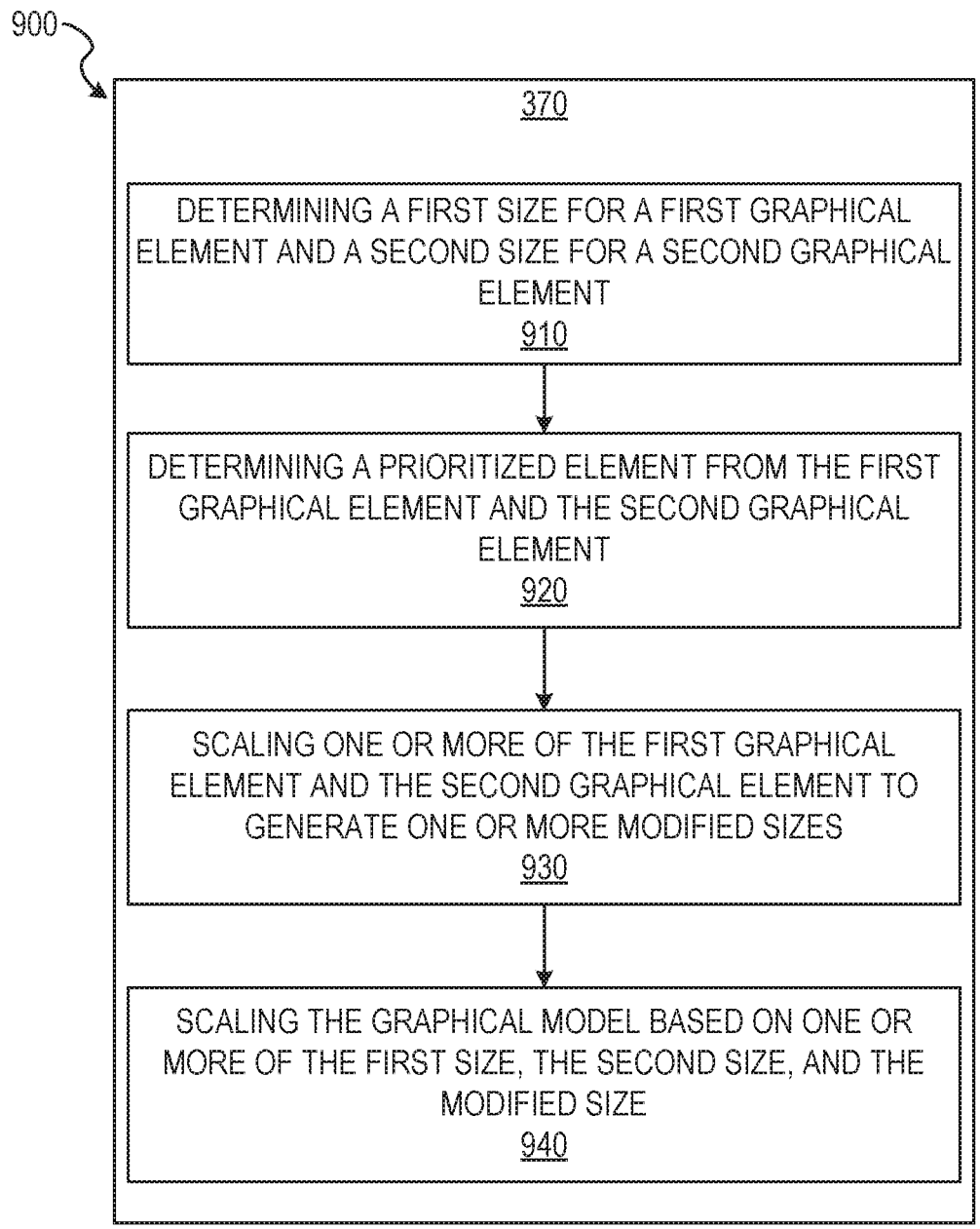
FIG. 9 is a flow diagram illustrating an example method for generating an ideogram from a set of images of an image stream, according to some example embodiments.

FIG. 9 depicts a flow diagram illustrating an example method 900 for generating an ideogram from a set of images of an image stream. The operations of method 900 may be performed by components of the ideogram generation system 160. In some instances, certain operations of the method 900 may be performed using one or more operations of the method 300 or as sub-operations of one or more operations of the method 300, as will be explained in more detail below.

In some example embodiments, as part of operation 370, in operation 910, the ideogram component 260 determines a first size for a first graphical element and a second size for a second graphical element. The first size and the second size may correspond to one or more measurements (e.g., a length or height) of the first graphical element and the second graphical element, respectively. In some instances, the sizes determined in operation 910 are a largest measurement of one or more of a length, a height, a diagonal, a circumference, or other suitable measurement.

In operation 920, the ideogram component 260 determines a prioritized element from the first graphical element and the second graphical element. In some instances, the ideogram component 260 determines the second graphical element is the prioritized element. The prioritized element may be selected based on priority values associated with each of the first graphical element and the second graphical element. For example, each graphical element may include a priority value indicative of a relative importance of the graphical element in ideograms in which the graphical element may be used. The priority value may represent the position type of the graphical element. For example, a background type graphical element may have a relative higher priority than a foreground type graphical element. Where the priority value is tied to the position type for the graphical element, the background type may be presented with a higher priority value as a basis, foundation, or theme on which the ideogram is generated. In some embodiments, the ideogram component 260 determines the prioritized element based on the first size and the second size determined for the first graphical element and the second graphical element, respectively. The ideogram component 260 may determine the prioritized element as a graphical element closest to a maximum size of one or more of the ideogram or a position type without exceeding the maximum size. The ideogram component 260, in these embodiments, determines the size of each of the first graphical element, the second graphical element, and a corresponding target ideogram size (e.g., a position type size or a maximum ideogram size), and determines which of the first graphical element and the second graphical is the largest and whether one of the graphical elements exceeds the target ideogram size.

In operation 930, the ideogram component 260 scales one or more of the first graphical element and the second graphical element to generate one or more modified sizes for the first graphical element and the second graphical element. Where the second graphical element is the prioritized element, the ideogram component 260 may scale the first size of the first graphical element to generate a modified size of the first graphical element based on the second size of the second graphical element. The graphical element being scaled may be resized relative to the other graphical element while retaining its original proportions so as to prevent skewing of the scaled graphical element.

In operation 940, the ideogram component 260 scales the graphical model (e.g., the composite model) based on the second size of the second graphical element and the modified size of the first graphical element. In some embodiments, the ideogram component 260 scales the graphical model to fit within the ideogram being generated (e.g., fit within a maximum size of the generated ideogram). The graphical model may be scaled to retain original proportions of the graphical model, as well as to fit within a scale of the first graphical element and the second graphical element. For example, where the graphical model is resized and placed in an ideogram having the first graphical element as a block lettered "Hawaii" banner in a foreground and the second graphical as a tropical island in a background, the graphical model may be resized and positioned in a scale and location suitable to appear to stand on a beach of the tropical island with the "Hawaii" banner in front of the graphical model.

Figure 10:
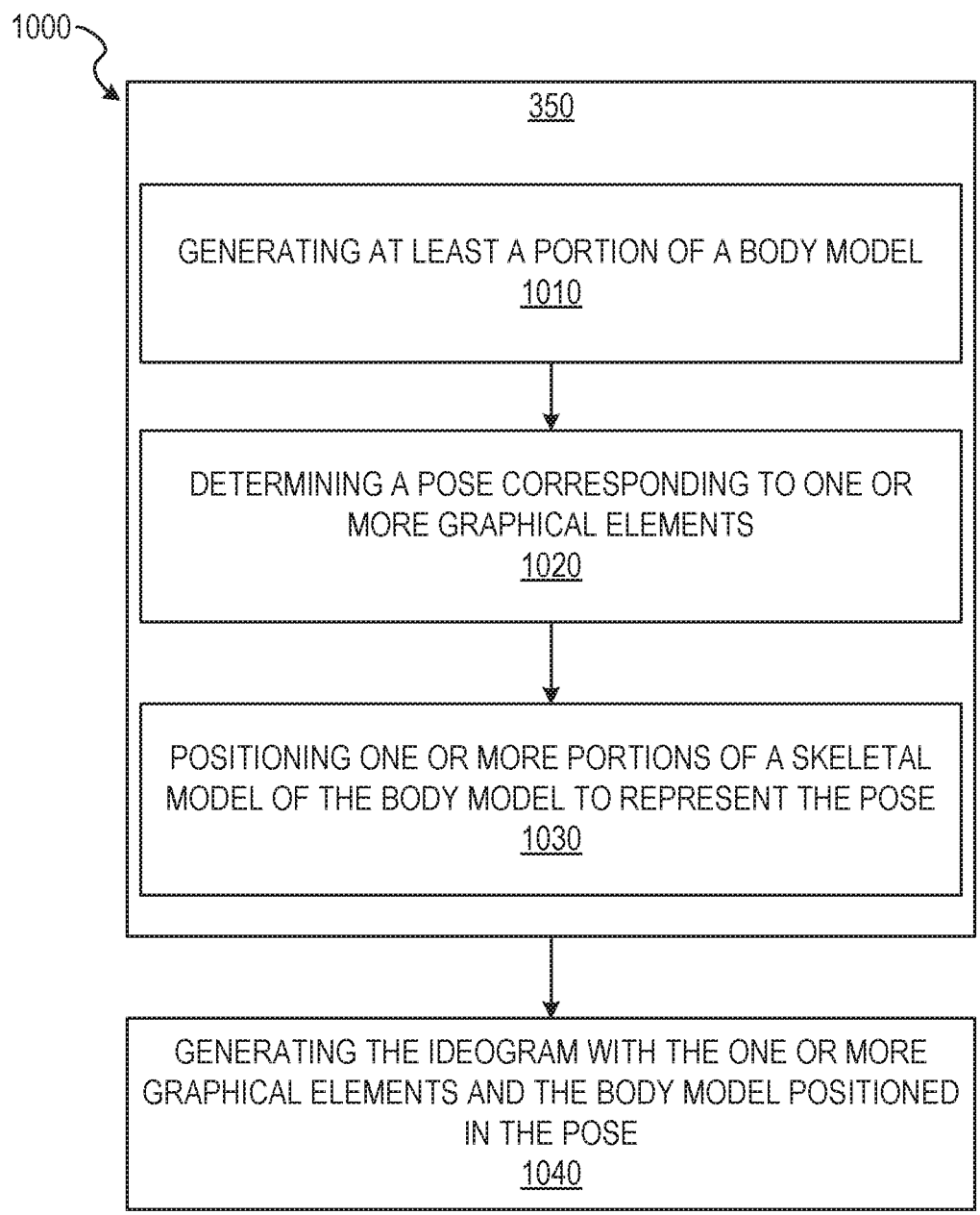
FIG. 10 is a flow diagram illustrating an example method for generating an ideogram from a set of images of an image stream, according to some example embodiments.

FIG. 10 depicts a flow diagram illustrating an example method 1000 for generating an ideogram from a set of images of an image stream. The operations of method 1000 may be performed by components of the ideogram generation system 160. In some instances, certain operations of the method 1000 may be performed using one or more operations of the method 300 or as sub-operations of one or more operations of the method 300, as will be explained in more detail below.

In some example embodiments, as part of operation 350, in operation 1010, the avatar component 250 generates at least a portion of a body model. The portion of the body model may be connected to the graphical model of the face to generate or form a composite model. The composite model represents all or a portion of a graphical representation of a body. The body model may be generated using a skeletal model movable to position at least a portion of the composite model. Movement of the skeletal model may configure the composite model into poses corresponding to poses of a body. For example, movement of one or more portions of the skeletal model may cause the composite model to appear as a body in a seated position, in a jumping position, waving, or any other suitable body pose.

In operation 1020, the avatar component 250 determines a pose corresponding to the one or more graphical elements. In some example embodiments, the avatar component 250 determines the pose for the one or more graphical elements based on pose data associated with the one or more graphical elements. The pose data may be included in metadata for the one or more graphical elements and indicate a pose and location at which the composite model is to be placed when an ideogram is generated including the graphical element. For example, where a graphical element is a beach scene including a reclining chair or hammock, the metadata may include position information identifying the location of the reclining chair or hammock within the graphical element and an indication that a seated or reclining pose is appropriate for the reclining chair or hammock. The pose data may include orientation of one or more elements (e.g., arms, legs, hands, feet, or body) of the skeletal model. The orientation may include relative positions of two or more elements of the skeletal model to indicate interaction between the elements, such as crossing arms, crossing legs, hand gestures, arm gestures, or body gestures.

In some example embodiments, the avatar component 250 determines the pose based on prompting user input to identify pose data (e.g., pose and location) for the composite model within the ideogram. The avatar component 250 may generate and cause presentation of one or more user interface elements indicating a set of poses and a set of locations. In these embodiments, the avatar component 250 generates selectable graphical user interface elements including an indication of one or more poses of the set of poses. The indication of a pose may be in the form of a written description, such as "sitting," "standing," "waving," "jumping," or other suitable textual descriptions. The indication of the pose may be in the form of a pictographic description, such as a picture of a sitting figure, a standing figure, a waving figure, a reclining figure, a jumping figure, or any other suitable image or animation.

The avatar component 250 may generate selectable graphical user interface elements indicating one or more locations of the set of locations at which the composite model may be placed. The indication of a location may be in the form of a textual description or a pictorial description. The textual descriptions may be provided using a plurality of user interface elements, each having a written description of a position, such as "upper left," "upper right." "center," "seated in chair." "reclining in hammock," "jumping from bottom right to bottom left." or any other suitable textual description. The pictorial descriptions may be in the form of images within user interface elements indicating locations on a background graphical element, a selectable grid positioned on the background graphical element, predetermined identified positions, or any other suitable pictorial indication. Where the pictorial description indicates a predetermined identified position, the predetermined identified position may be shown by a broken line (e.g., cutout) depicting the pose and location of a composite model, a selectable version of the composite model placed in one or more locations within the background, or any other suitable pictorial description.

The graphical user interface elements may be presented on a dedicated graphical user interface presentation (e.g., a rendered screen); as an overlay above a presentation of one or more of the graphical model, the composite model, the one or more graphical elements for use in the ideogram, or a generated or partially generated ideogram; or in any other suitable manner such that the user may be prompted, by selectable elements, to supply user input identifying the pose data. Graphical user interface elements may be presented in an order showing pose elements prior to location elements, where the pose affects the possible locations (e.g., a jumping animation or a reclining pose). In some instances, the graphical user interface elements may be presented to enable a selection of the location prior to selection of the pose or contemporaneous with the selection of the pose.

The avatar component 250 may also generate and cause presentation of the one or more user interface elements indicating the set of poses and enabling free form selection of the location of the composite model within the ideogram. In these example embodiments, the avatar component 250 may generate and cause presentation of user interface elements for pose selection as described above. Free form selection of the location may be enabled by generating and causing presentation of a draggable or otherwise positionable version of the composite model. The positionable composite model may be presented within or over a background graphical element to be used as a background for the ideogram. In some example embodiments, the composite model may be presented in a selected pose. The positionable composite model may also be presented in a neutral pose (e.g., a pose which has not previously been selected), and the avatar component 250 may enable selection of the pose after the composite model is positioned within the background graphical element.

In operation 1030, the avatar component 250 positions one or more portions of the skeletal model of the composite model to represent the pose of operation 1020. The avatar component 250 may position the skeletal model of the composite model based on one or more of the pose data for the one or more graphical elements and the user input indicating at least one of a pose and a location. The avatar component 250 may position the one or more portions of the skeletal model by matching positions or orientations indicated in the pose data or the user input, placing the graphical model (e.g., the face model) on a pre-generated body model matching the pose, or any other suitable manner.

In operation 1040, the ideogram component 260 generates the ideogram with the one or more graphical element and the composite model positioned in the pose. The ideogram component 260 may generate the ideogram similarly to or the same as described above with respect to operations 370 or 820.

Modules, Components, and Logic

Certain embodiments are described herein as including logic or a number of components, modules, or mechanisms. Components can constitute hardware components. A "hardware component" is a tangible unit capable of performing certain operations and can be configured or arranged in a certain physical manner. In various example embodiments, computer systems (e.g., a standalone computer system, a client computer system, or a server computer system) or hardware components of a computer system (e.g., at least one hardware processor, a processor, or a group of processors) is configured by software (e.g., an application or application portion) as a hardware component that operates to perform certain operations as described herein.

In some embodiments, a hardware component is implemented mechanically, electronically, or any suitable combination thereof. For example, a hardware component can include dedicated circuitry or logic that is permanently configured to perform certain operations. For example, a hardware component can be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component can include software encompassed within a general-purpose processor or other programmable processor. It will be appreciated that the decision to implement a hardware component mechanically, in dedicated and permanently configured circuitry, or in temporarily configured circuitry (e.g., configured by software) can be driven by cost and time considerations.

Accordingly, the phrase "hardware component" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented component" refers to a hardware component. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software can accordingly configure a particular processor or processors, for example, to constitute a particular hardware component at one instance of time and to constitute a different hardware component at a different instance of time.

Hardware components can provide information to, and receive information from, other hardware components. Accordingly, the described hardware components can be regarded as being communicatively coupled. Where multiple hardware components exist contemporaneously, communications can be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component performs an operation and stores the output of that operation in a memory device to which it is communicatively coupled. A further hardware component can then, at a later time, access the memory device to retrieve and process the stored output. Hardware components can also initiate communications with input or output devices, and can operate on a resource (e.g., a collection of information).

The various operations of example methods described herein can be performed, at least partially, by processors that are temporarily configured (e.g., by software) or permanently configured to perform the relevant operations. Whether temporarily or permanently configured, such processors constitute processor-implemented components that operate to perform operations or functions described herein. As used herein, "processor-implemented component" refers to a hardware component implemented using processors.

Similarly, the methods described herein can be at least partially processor-implemented, with a particular processor or processors being an example of hardware. For example, at least some of the operations of a method can be performed by processors or processor-implemented components. Moreover, the processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via appropriate interfaces (e.g., an Application Program Interface (API)).

The performance of certain of the operations may be distributed among the processors, not only residing within a single machine, but deployed across a number of machines. In some example embodiments, the processors or processor-implemented components are located in a single geographic location (e.g., within a home environment, an office environment, or a server farm). In other example embodiments, the processors or processor-implemented components are distributed across a number of geographic locations.

Applications

Figure 11:
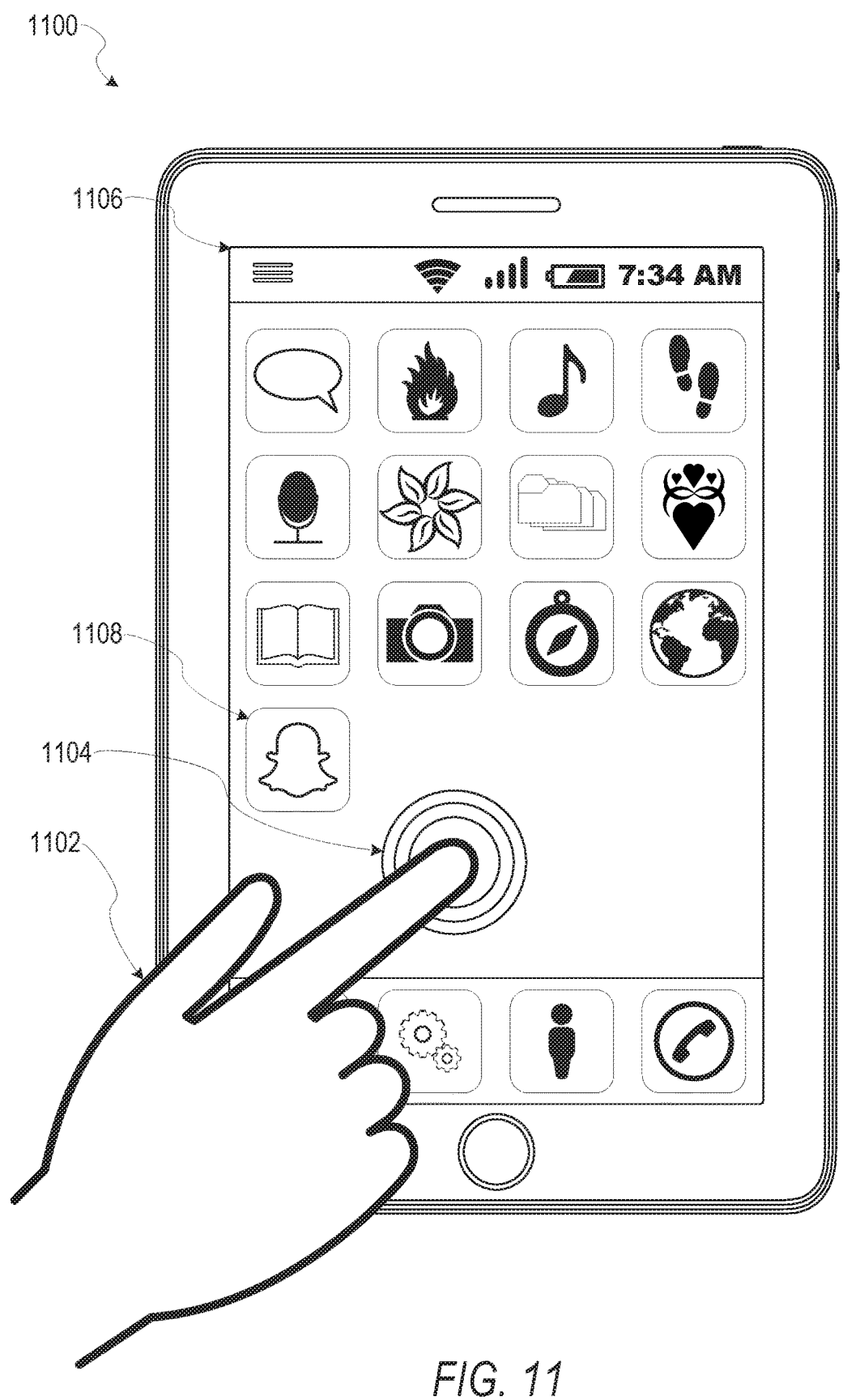
FIG. 11 is a user interface diagram depicting an example mobile device and mobile operating system interface, according to some example embodiments.

FIG. 11 illustrates an example mobile device 1100 executing a mobile operating system (e.g., IOS™, ANDROID™, WINDOWS® Phone, or other mobile operating systems), consistent with some embodiments. In one embodiment, the mobile device 1100 includes a touch screen operable to receive tactile data from a user 1102. For instance, the user 1102 may physically touch 1104 the mobile device 1100, and in response to the touch 1104, the mobile device 1100 may determine tactile data such as touch location, touch force, or gesture motion. In various example embodiments, the mobile device 1100 displays a home screen 1106 (e.g., Springboard on IOS™) operable to launch applications or otherwise manage various aspects of the mobile device 1100. In some example embodiments, the home screen 1106 provides status information such as battery life, connectivity, or other hardware statuses. The user 1102 can activate user interface elements by touching an area occupied by a respective user interface element. In this manner, the user 1102 interacts with the applications of the mobile device 1100. For example, touching the area occupied by a particular icon included in the home screen 1106 causes launching of an application corresponding to the particular icon.

The mobile device 1100, as shown in FIG. 11, includes an imaging device 1108. The imaging device 1108 may be a camera or any other device coupled to the mobile device 1100 capable of capturing a video stream or one or more successive images. The imaging device 1108 may be triggered by the ideogram generation system 160 or a selectable user interface element to initiate capture of a video stream or succession of images and pass the video stream or succession of images to the ideogram generation system 160 for processing according to the one or more methods described in the present disclosure.

Many varieties of applications (also referred to as "apps") can be executing on the mobile device 1100, such as native applications (e.g., applications programmed in Objective-C, Swift, or another suitable language running on IOS™, or applications programmed in Java running on ANDROID™), mobile web applications (e.g., applications written in Hypertext Markup Language-5 (HTML5)), or hybrid applications (e.g., a native shell application that launches an HTML5 session). For example, the mobile device 1100 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 1100 includes a social messaging app 1110 such as SNAPCHAT® that, consistent with some embodiments, allows users to exchange ephemeral messages that include media content. In this example, the social messaging app 1110 can incorporate aspects of embodiments described herein. For example, in some embodiments the social messaging application includes an ephemeral gallery of media created by users the social messaging application. These galleries may consist of videos or pictures posted by a user and made viewable by contacts (e.g., "friends") of the user. Alternatively, public galleries may be created by administrators of the social messaging application consisting of media from any users of the application (and accessible by all users). In yet another embodiment, the social messaging application may include a "magazine" feature which consists of articles and other content generated by publishers on the social messaging application's platform and accessible by any users. Any of these environments or platforms may be used to implement concepts of the present inventive subject matter.

In some embodiments, an ephemeral message system may include messages having ephemeral video clips or images which are deleted following a deletion trigger event such as a viewing time or viewing completion. In such embodiments, a device implementing the ideogram generation system 160 may identify, track, extract, and modify an area of interest and the color depicted therein within the ephemeral video clip, as the ephemeral video clip is being captured by the device, and transmit the ephemeral video clip to another device using the ephemeral message system.

Software Architecture

Figure 12:
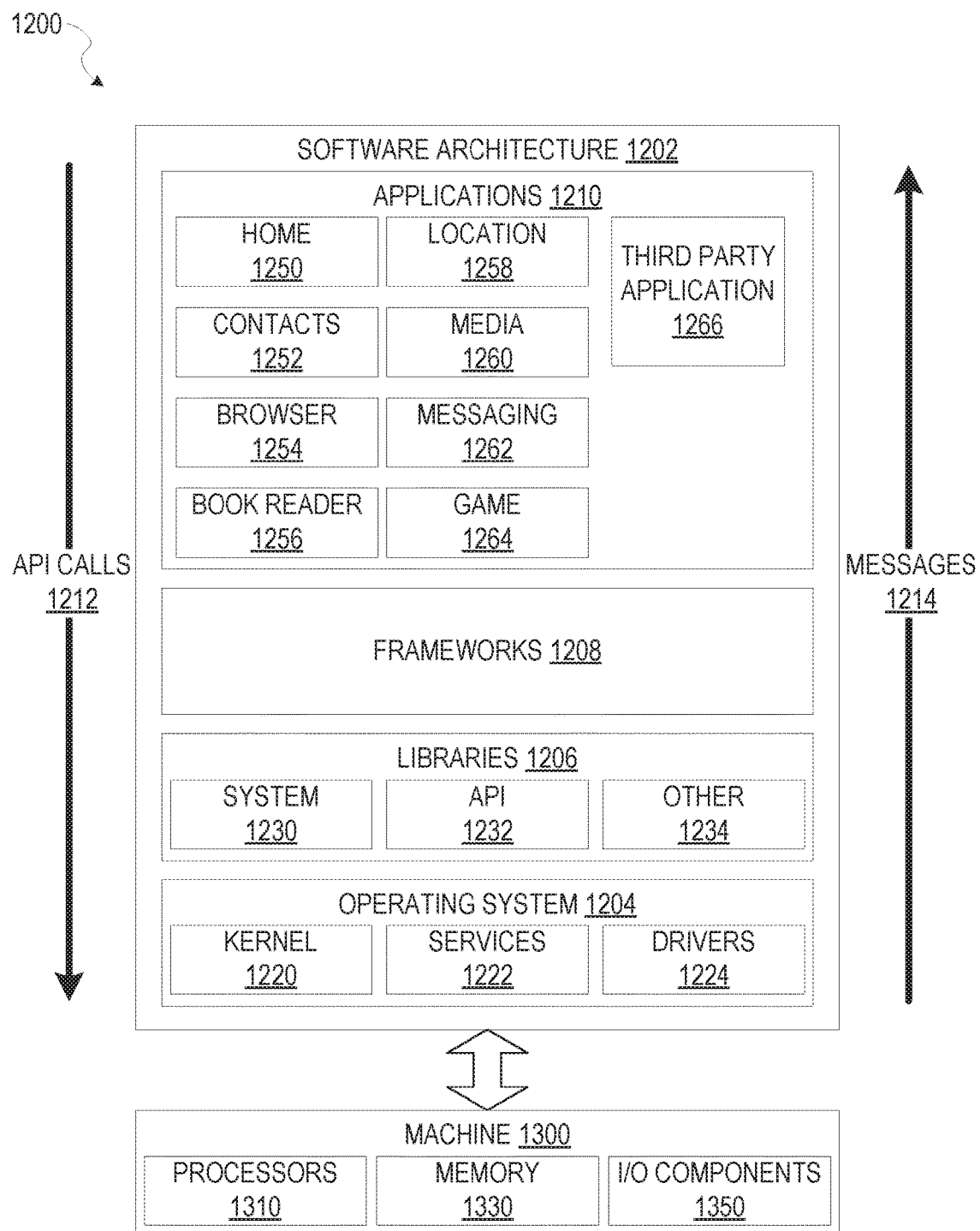
FIG. 12 is a block diagram illustrating an example of a software architecture that may be installed on a machine, according to some example embodiments.

FIG. 12 is a block diagram 1200 illustrating an architecture of software 1202, which can be installed on the devices described above. FIG. 12 is merely a non-limiting example of a software architecture, and it will be appreciated that many other architectures can be implemented to facilitate the functionality described herein. In various embodiments, the software 1202 is implemented by hardware such as machine a 1300 of FIG. 13 that includes processors 1310, memory 1330, and I/O components 1350. In this example architecture, the software 1202 can be conceptualized as a stack of layers where each layer may provide a particular functionality. For example, the software 1202 includes layers such as an operating system 1204, libraries 1206, frameworks 1208, and applications 1210. Operationally, the applications 1210 invoke application programming interface (API) calls 1212 through the software stack and receive messages 1214 in response to the API calls 1212, consistent with some embodiments.

In various implementations, the operating system 1204 manages hardware resources and provides common services. The operating system 1204 includes, for example, a kernel 1220, services 1222, and drivers 1224. The kernel 1220 acts as an abstraction layer between the hardware and the other software layers consistent with some embodiments. For example, the kernel 1220 provides memory management, processor management (e.g., scheduling), component management, networking, and security settings, among other functionality. The services 1222 can provide other common services for the other software layers. The drivers 1224 are responsible for controlling or interfacing with the underlying hardware, according to some embodiments. For instance, the drivers 1224 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 1206 provide a low-level common infrastructure utilized by the applications 1210. The libraries 1206 can include system libraries 1230 (e.g., C standard library) that can provide functions such as memory allocation functions, string manipulation functions, mathematic functions, and the like. In addition, the libraries 1206 can include API libraries 1232 such as media libraries (e.g., libraries to support presentation and manipulation of various media formats such as Moving Picture Experts Group-4 (MPEG4), Advanced Video Coding (H.264 or AVC). Moving Picture Experts Group Layer-3 (MP3). Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1206 can also include a wide variety of other libraries 1234 to provide many other APIs to the applications 1210.

The frameworks 1208 provide a high-level common infrastructure that can be utilized by the applications 1210, according to some embodiments. For example, the frameworks 1208 provide various graphic user interface (GUI) functions, high-level resource management, high-level location services, and so forth. The frameworks 1208 can provide a broad spectrum of other APIs that can be utilized by the applications 1210, some of which may be specific to a particular operating system or platform.

In an example embodiment, the applications 1210 include a home application 1250, a contacts application 1252, a browser application 1254, a book reader application 1256, a location application 1258, a media application 1260, a messaging application 1262, a game application 1264, and a broad assortment of other applications such as a third party application 1266. According to some embodiments, the applications 1210 are programs that execute functions defined in the programs. Various programming languages can be employed to create the applications 1210, structured in a variety of manners, such as object-oriented programming languages (e.g., Objective-C, Java, or C++) or procedural programming languages (e.g., C or assembly language). In a specific example, the third party application 1266 (e.g., an application developed using the ANDROID™ or IOS™ software development kit (SDK) by an entity other than the vendor of the particular platform) may be mobile software running on a mobile operating system such as IOS™, ANDROID™. WINDOWS® PHONE, or another mobile operating systems. In this example, the third party application 1266 can invoke the API calls 1212 provided by the operating system 1204 to facilitate functionality described herein.

Example Machine Architecture and Machine-Readable Medium

Figure 13:
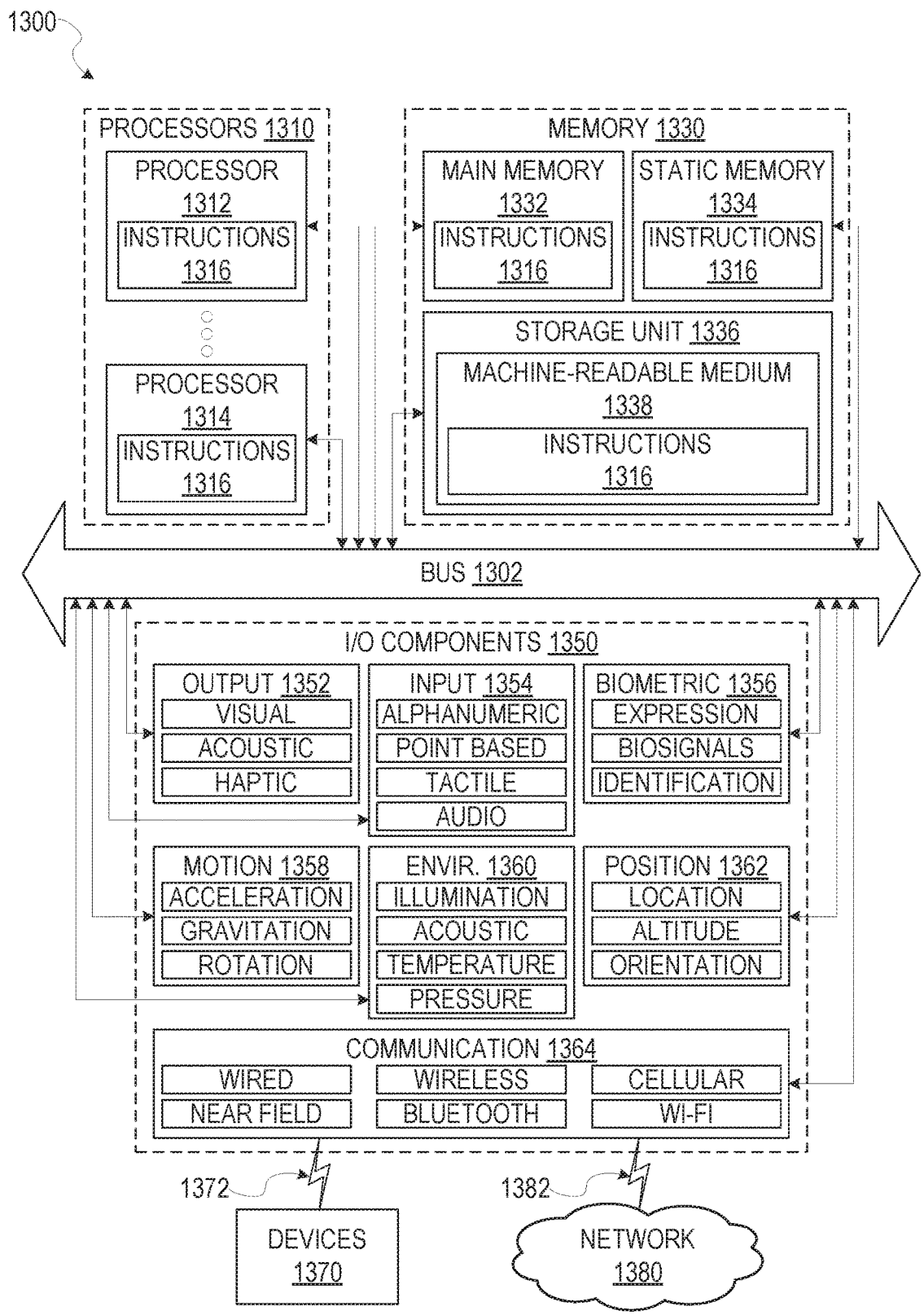
FIG. 13 is a block diagram presenting a diagrammatic representation of a machine in the form of a computer system within which a set of instructions may be executed for causing the machine to perform any of the methodologies discussed herein, according to an example embodiment.

FIG. 13 is a block diagram illustrating components of a machine 1300, according to some embodiments, able to read instructions (e.g., processor executable instructions) from a machine-readable medium (e.g., a non-transitory machine-readable storage medium) and perform any of the methodologies discussed herein. Specifically. FIG. 13 shows a diagrammatic representation of the machine 1300 in the example form of a computer system, within which instructions 1316 (e.g., software, a program, an application, an applet, an app, or other executable code) for causing the machine 1300 to perform any of the methodologies discussed herein can be executed. In alternative embodiments, the machine 1300 operates as a standalone device or can be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1316, sequentially or otherwise, that specify actions to be taken by the machine 1300. Further, while only a single machine 1300 is illustrated, the term "machine" shall also be taken to include a collection of machines 1300 that individually or jointly execute the instructions 1316 to perform any of the methodologies discussed herein.

In various embodiments, the machine 1300 comprises processors 1310, memory 1330, and I/O components 1350, which can be configured to communicate with each other via a bus 1302. In an example embodiment, the processors 1310 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) include, for example, a processor 1312 and a processor 1314 that may execute the instructions 1316. The term "processor" is intended to include multi-core processors that may comprise two or more independent processors (also referred to as "cores") that can execute instructions 1316 contemporaneously. Although FIG. 13 shows multiple processors 1310, the machine 1300 may include a single processor with a single core, a single processor with multiple cores (e.g., a multi-core processor), multiple processors with a single core, multiple processors with multiples cores, or any combination thereof.

The memory 1330 comprises a main memory 1332, a static memory 1334, and a storage unit 1336 accessible to the processors 1310 via the bus 1302, according to some embodiments. The storage unit 1336 can include a machine-readable medium 1338 on which are stored the instructions 1316 embodying any of the methodologies or functions described herein. The instructions 1316 can also reside, completely or at least partially, within the main memory 1332, within the static memory 1334, within at least one of the processors 1310 (e.g., within the processor's cache memory), or any suitable combination thereof, during execution thereof by the machine 1300. Accordingly, in various embodiments, the main memory 1332, the static memory 1334, and the processors 1310 are considered machine-readable media 1338.

As used herein, the term "memory" refers to a machine-readable medium 1338 able to store data temporarily or permanently and may be taken to include, but not be limited to, random-access memory (RAM), read-only memory (ROM), buffer memory, flash memory, and cache memory. While the machine-readable medium 1338 is shown in an example embodiment to be a single medium, the term "machine-readable medium" should be taken to include a single medium or multiple media (e.g., a centralized or distributed database, or associated caches and servers) able to store the instructions 1316. The term "machine-readable medium" shall also be taken to include any medium, or combination of multiple media, that is capable of storing instructions (e.g., instructions 1316) for execution by a machine (e.g., machine 1300), such that the instructions, when executed by processors of the machine 1300 (e.g., processors 1310), cause the machine 1300 to perform any of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1350 include a wide variety of components to receive input, provide output, produce output, transmit information, exchange information, capture measurements, and so on. In general, it will be appreciated that the I/O components 1350 can include many other components that are not shown in FIG. 13. The I/O components 1350 are grouped according to functionality merely for simplifying the following discussion, and the grouping is in no way limiting. In various example embodiments, the I/O components 1350 include output components 1352 and input components 1354. The output components 1352 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1354 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1350 include biometric components 1356, motion components 1358, environmental components 1360, or position components 1362, among a wide array of other components. For example, the biometric components 1356 include components to detect expressions (e.g., hand expressions, facial expressions, vocal expressions, body gestures, or mouth gestures), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1358 include acceleration sensor components (e.g., accelerometer), gravitation sensor components, rotation sensor components (e.g., gyroscope), and so forth. The environmental components 1360 include, for example, illumination sensor components (e.g., photometer), temperature sensor components (e.g., thermometers that detect ambient temperature), humidity sensor components, pressure sensor components (e.g., barometer), acoustic sensor components (e.g., microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1362 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1350 may include communication components 1364 operable to couple the machine 1300 to a network 1380 or devices 1370 via a coupling 1382 and a coupling 1372, respectively. For example, the communication components 1364 include a network interface component or another suitable device to interface with the network 1380. In further examples, communication components 1364 include wired communication components, wireless communication components, cellular communication components, Near Field Communication (NFC) components. BLUETOOTH® components (e.g., BLUETOOTH® Low Energy), WI-FI® components, and other communication components to provide communication via other modalities. The devices 1370 may be another machine or any of a wide variety of peripheral devices (e.g., a peripheral device coupled via a Universal Serial Bus (USB)).

Moreover, in some embodiments, the communication components 1364 detect identifiers or include components operable to detect identifiers. For example, the communication components 1364 include Radio Frequency Identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code. Data Matrix, Dataglyph, MaxiCode, PDF417, Ultra Code. Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1364, such as location via Internet Protocol (IP) geo-location, location via WI-FI® signal triangulation, location via detecting a BLUETOOTH® or NFC beacon signal that may indicate a particular location, and so forth.

Transmission Medium

In various example embodiments, portions of the network 1380 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1380 or a portion of the network 1380 may include a wireless or cellular network, and the coupling 1382 may be a Code Division Multiple Access (CDMA) connection, a Global System for Mobile communications (GSM) connection, or another type of cellular or wireless coupling. In this example, the coupling 1382 can implement any of a variety of types of data transfer technology, such as Single Carrier Radio Transmission Technology (1×RTT). Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks. Universal Mobile Telecommunications System (UMTS), High Speed Packet Access (HSPA). Worldwide Interoperability for Microwave Access (WiMAX), Long Term Evolution (LTE) standard, others defined by various standard-setting organizations, other long range protocols, or other data transfer technology.

In example embodiments, the instructions 1316 are transmitted or received over the network 1380 using a transmission medium via a network interface device (e.g., a network interface component included in the communication components 1364) and utilizing any one of a number of well-known transfer protocols (e.g., Hypertext Transfer Protocol (HTTP)). Similarly, in other example embodiments, the instructions 1316 are transmitted or received using a transmission medium via the coupling 1372 (e.g., a peer-to-peer coupling) to the devices 1370. The term "transmission medium" shall be taken to include any intangible medium that is capable of storing, encoding, or carrying the instructions 1316 for execution by the machine 1300, and includes digital or analog communications signals or other intangible media to facilitate communication of such software.

Furthermore, the machine-readable medium 1338 is non-transitory (in other words, not having any transitory signals) in that it does not embody a propagating signal. However, labeling the machine-readable medium 1338 "non-transitory" should not be construed to mean that the medium is incapable of movement; the medium should be considered as being transportable from one physical location to another. Additionally, since the machine-readable medium 1338 is tangible, the medium may be considered to be a machine-readable device.

Language

Throughout this specification, plural instances may implement components, operations, or structures described as a single instance. Although individual operations of methods are illustrated and described as separate operations, individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, components, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
    detecting, by one or more processors of a first mobile computing device, a portion of a face within one or more images;
    identifying a set of facial landmarks within the portion of the face depicted within the one or more images;
    in response to detecting the portion of the face and identifying the set of facial landmarks, determining one or more characteristics representing the portion of the face depicted in the one or more images;
    based on the one or more characteristics and the set of facial landmarks, generating a graphical model of a face including the portion of the face depicted within the one or more images, the graphical model generated by rendering a base face and applying one or more generated features corresponding to the one or more characteristics and the set of facial landmarks;
    positioning one or more graphical elements proximate to the graphical model of the face;
    generating a digital sticker from the graphical model and the one or more graphical elements, the digital sticker combining the graphical model and the one or more graphical elements to represent at least a portion of a message and configured for presentation within a messaging application, wherein a first graphical element of the one or more graphical elements has a first size and a second graphical element of the one or more graphical elements has a second size;
    determining configuration information of the messaging application comprising minimum dimension information or maximum dimension information of digital stickers in the messaging application;
    determining that the second size of the second graphical element is closer to the maximum dimension information of digital stickers in the messaging application than the first size of the first graphical element;
    based on determining that the second size of the second graphical element is closer to the maximum dimension information than the first size of the first graphical element, determining the second graphical element is a prioritized element;
    based on determining that the second graphical element is the prioritized element, scaling the first size of the first graphical element to generate a modified size of the first graphical element based on the second size of the second graphical element;
    scaling the graphical model to generate a scaled graphical model based on the second size of the second graphical element and the modified size of the first graphical element; and
    transmitting the digital sticker to a second mobile computing device via the messaging application.

2. The method of claim 1, wherein positioning the one or more graphical elements further comprises:
    determining that a position type of a graphical element is a background type, the graphical element included in the one or more graphical elements; and
    positioning the graphical element behind at least a portion of the graphical model such that the portion of the graphical model obstructs at least a portion of the graphical element.

3. The method of claim 1, wherein positioning the one or more graphical elements further comprises:
    determining that a position type of a graphical element is a foreground type, the graphical element included in the one or more graphical elements; and
    positioning at least a portion of the graphical model behind the graphical element such that the graphical element obstructs the portion of the graphical model.

4. The method of claim 1, wherein the graphical model is a three-dimensional graphical model and the one or more graphical elements are two-dimensional graphical elements, and generating the digital sticker further comprises:
    in response to positioning the one or more graphical elements, rendering the three-dimensional graphical model as a two-dimensional graphical model; and
    rendering the digital sticker as a two-dimensional digital sticker combining the two-dimensional graphical model and the one or more graphical elements.

5. The method of claim 1 further comprising:
    determining that second graphical element is of a background type and the first graphical element is of a foreground type; and
    based on determining that second graphical element is of the background type and the first graphical element is of the foreground type, determining the second graphical element is the prioritized element.

6. The method of claim 1, further comprising:
    receiving a user selection of a theme associated with the digital sticker; and
    selecting, in response to receiving the user selection of the theme, the first and second graphical elements from a plurality of graphical elements as the one or more graphical elements to generate the digital sticker, the first and second graphical elements being associated with the theme and being of different types.

7. The method of claim 1, further comprising:
generating at least a portion of a body model connected to the graphical model of the face to generate a composite model, the body model having a skeletal representation movable to position at least a portion of the composite model;
determining a pose corresponding to the one or more graphical elements;
positioning one or more portions of the skeletal representation of the composite model to represent the pose; and
generating the digital sticker with the one or more graphical element and the composite model positioned in the pose.

8. A system comprising:
one or more processors of a first mobile computing device; and
a non-transitory processor-readable storage medium storing processor executable instructions that, when executed by the one or more processors, cause the one or more processors to perform operations comprising:
  detecting, by the one or more processors, a portion of a face within one or more Images;
  identifying a set of facial landmarks within the portion of the face depicted within the one or more Images;
  in response to detecting the portion of the face and identifying the set of facial landmarks, determining one or more characteristics representing the portion of the face depicted in the one or more images;
  based on the one or more characteristics and the set of facial landmarks, generating a graphical model of a face including the portion of the face depicted within the one or more images, the graphical model generated by rendering a base face and applying one or more generated features corresponding to the one or more characteristics and the set of facial landmarks;
  positioning one or more graphical elements proximate to the graphical model of the face;
  generating a digital sticker from the graphical model and the one or more graphical elements, the digital sticker combining the graphical model and the one or more graphical elements to represent at least a portion of a message and configured for presentation within a messaging application;
  determining configuration information of the messaging application comprising minimum dimension information or maximum dimension information of digital stickers in the messaging application;
  determining that the second size of the second graphical element is closer to the maximum dimension information of digital stickers in the messaging application than the first size of the first graphical element;
  based on determining that the second size of the second graphical element is closer to the maximum dimension information than the first size of the first graphical element, determining the second graphical element is a prioritized element;
  based on determining that the second graphical element is the prioritized element, scaling the first size of the first graphical element to generate a modified size of the first graphical element based on the second size of the second graphical element;
  scaling the graphical model to generate a scaled graphical model based on the second size of the second graphical element and the modified size of the first graphical element; and
  transmitting the digital sticker to a second mobile computing device via the messaging application.

9. The system of claim 8, wherein the graphical model is a three-dimensional graphical model and the one or more graphical elements are two-dimensional graphical elements, and generating the digital sticker further comprises:
  in response to positioning the one or more graphical elements, rendering the three-dimensional graphical model as a two-dimensional graphical model; and
  rendering the digital sticker as a two-dimensional digital sticker combining the two-dimensional graphical model and the one or more graphical elements.

10. The system of claim 8, wherein the operations further comprise:
  determining that second graphical element is of a background type and the first graphical element is of a foreground type; and
  based on determining that second graphical element is of the background type and the first graphical element is of the foreground type, determining the second graphical element is the prioritized element.

11. The system of claim 8, wherein the operations further comprise:
  generating at least a portion of a body model connected to the graphical model of the face to generate a composite model, the body model having a skeletal representation movable to position at least a portion of the composite model;
  determining a pose corresponding to the one or more graphical elements;
  positioning one or more portions of the skeletal representation of the composite model to represent the pose; and
  generating the digital sticker with the one or more graphical element and the composite model positioned in the pose.

12. A non-transitory processor-readable storage medium storing processor executable instructions that, when executed by one or more processors of a first mobile computing device, cause the first mobile computing device to perform operations comprising:
  detecting the a portion of a face within one or more images;
  identifying a set of facial landmarks within the portion of the face depicted within the one or more Images;
  in response to detecting the portion of the face and identifying the set of facial landmarks, determining one or more characteristics representing the portion of the face depicted in the one or more images;
  based on the one or more characteristics and the set of facial landmarks, generating a graphical model of a face including the portion of the face depicted within the one or more images, the graphical model generated by rendering a base face and applying one or more generated features corresponding to the one or more characteristics and the set of facial landmarks;
  positioning one or more graphical elements proximate to the graphical model of the face;
  generating a digital sticker from the graphical model and the one or more graphical elements, the digital sticker combining the graphical model and the one or more graphical elements to represent at least a portion of a message and configured for presentation within a messaging application;

determining configuration information of the messaging application comprising minimum dimension information or maximum dimension information of digital stickers in the messaging application;

determining that the second size of the second graphical element is closer to the maximum dimension information of digital stickers in the messaging application than the first size of the first graphical element;

based on determining that the second size of the second graphical element is closer to the maximum dimension information than the first size of the first graphical element, determining the second graphical element is a prioritized element;

based on determining that the second graphical element is the prioritized element, scaling the first size of the first graphical element to generate a modified size of the first graphical element based on the second size of the second graphical element;

scaling the graphical model to generate a scaled graphical model based on the second size of the second graphical element and the modified size of the first graphical element; and transmitting the digital sticker to a second mobile computing device via the messaging application.

13. The non-transitory processor-readable storage medium of claim 12, wherein the graphical model is a three-dimensional graphical model and the one or more graphical elements are two-dimensional graphical elements, and generating the digital sticker further comprises:

in response to positioning the one or more graphical elements, rendering the three-dimensional graphical model as a two-dimensional graphical model; and rendering the digital sticker as a two-dimensional digital sticker combining the two-dimensional graphical model and the one or more graphical elements.

14. The non-transitory processor-readable storage medium of claim 12, wherein the operations further comprise:

generating at least a portion of a body model connected to the graphical model of the face to generate a composite model, the body model having a skeletal representation movable to position at least a portion of the composite model;

determining a pose corresponding to the one or more graphical elements;

positioning one or more portions of the skeletal representation of the composite model to represent the pose; and generating the digital sticker with the one or more graphical element and the composite model positioned in the pose.

* * * * *

UNITED STATES PATENT AND TRADEMARK OFFICE
CERTIFICATE OF CORRECTION

PATENT NO. : 10,360,708 B2
APPLICATION NO. : 15/199472
DATED : July 23, 2019
INVENTOR(S) : Bondich et al.

Page 1 of 1

It is certified that error appears in the above-identified patent and that said Letters Patent is hereby corrected as shown below:

On the Title Page

In item (71), in "Applicant", in Column 1, Line 1, delete "Inc," and insert --Inc.,-- therefor On page 2, in Column 2, under "Other Publications", Lines 17-18, delete "Oct. 18, 2018 t "," and insert --Oct. 18, 2018",-- therefor Signed and Sealed this
Fifteenth Day of December, 2020

Andrei Iancu
*Director of the United States Patent and Trademark Office*